United States Patent [19]
Omae et al.

[11] Patent Number: 6,019,829
[45] Date of Patent: Feb. 1, 2000

[54] CARBON BLACK AGGREGATE

[75] Inventors: Yoshihiro Omae, Kitakyushu; Syushichi Yoshimura, Yokkaichi; Michihiro Ikeda; Tadashi Hashiguchi, both of Kitakyushu; Akiyoshi Ohnishi, Yokkaichi; Shuuhei Taohata, Kitakyushu, all of Japan

[73] Assignee: Mitsubishi Chemical Corporation, Tokyo, Japan

[21] Appl. No.: 08/960,321

[22] Filed: Oct. 29, 1997

[30] Foreign Application Priority Data

| Oct. 31, 1996 | [JP] | Japan | 8-290153 |
| Nov. 1, 1996 | [JP] | Japan | 8-291522 |
| Feb. 27, 1997 | [JP] | Japan | 9-043611 |
| Mar. 24, 1997 | [JP] | Japan | 9-070299 |
| Mar. 24, 1997 | [JP] | Japan | 9-070302 |
| Mar. 25, 1997 | [JP] | Japan | 9-071207 |
| Jul. 25, 1997 | [JP] | Japan | 9-199867 |

[51] Int. Cl.[7] .................................. C09D 11/00

[52] U.S. Cl. ................ 106/31.65; 106/31.9; 106/472; 106/476

[58] Field of Search ................... 106/472, 476, 106/31.65, 31.9; 428/403, 407

[56] References Cited

U.S. PATENT DOCUMENTS

| 4,337,294 | 6/1982 | Gunnell | 428/407 |
| 4,440,807 | 4/1984 | Gunnell | 427/221 |
| 4,530,305 | 7/1985 | Gunnell | 118/418 |
| 5,053,278 | 10/1991 | Nakada et al. | 428/403 |
| 5,498,372 | 3/1996 | Hedges | 252/511 |

FOREIGN PATENT DOCUMENTS

0 590 523 A2  4/1994  European Pat. Off. .

*Primary Examiner*—Helene Klemanski
*Attorney, Agent, or Firm*—Oblon, Spivak, McClelland, Maier & Neustadt, P.C.

[57] ABSTRACT

A carbon black aggregate having a surface hardness of at least 70 g and having a covering.

11 Claims, No Drawings

CARBON BLACK AGGREGATE

CARBON BLACK AGGREGATE

The present invention relates to carbon black of a form which is less susceptible to powdering or breakage during transportation or storage, or less likely to bring about environmental pollution during use, and which is excellent in dispersibility in a vehicle.

Carbon black is industrially widely used as a pigment which imparts a black color to an ink, a coating material, a resin or the like, or as a reinforcing material for rubber represented by tires. Historically, carbon black started from soot made of pine smoke as disclosed in a literature written in the Kan age in China and was developed as one produced by a channel black method by Mc. Nutt in U.S.A in 1892 and as one prepared by a furnace method by Phillips in 1942. The yield of carbon black has remarkably been improved since then, and the technology for controlling the particle size or the structure length of particles has shown a remarkable progress.

On the other hand, with respect to the form of carbon black, no adequate improvement has been made. The form of carbon black industrially employed is limited to a powder product, a tumbling granulation product or a flake product. Such a form has a problem such that, in the case of the powder product, dusting or environmental pollution is substantial, or the bulk density is so low that the transportation costs will be high. In the case of the tumbling granulation product, dusting can be reduced, but there is a problem that the dispersibility tends to be poor when it is used for an ink or a coating material. Namely, in the carbon black industry, it has been believed that reduction of the environmental pollution and improvement of the dispersibility are in an antinomic relation to each other.

With respect to powdery pigments in general, there were some attempts in the past to improve the dispersibility in a vehicle. For example, JP-A-51-1530 or JP-A-52-103422 proposed to prepare a pigment having good dispersibility by dispersing a pigment, a resin, a plasticizer, etc., in a solvent, followed by freeze-drying. Further, JP-A-57-49664 proposed a method in which a water-soluble polymer is added to a pigment to obtain a slurry, and the slurry is spray-dried. However, these methods had drawbacks that the treating costs were high, and it was difficult to carry out treatment of a large amount on an industrial scale. Further, the effect for preventing scattering or dusting was not adequate.

Further, JP-A-2-142858 or JP-A-3-193129 discloses one having the initial dispersibility improved by carbon black compression-granulated by a roller compactor. However, dusting during use was not sufficiently improved. Further, improvement to a high bulk density was not adequate either.

JP-A-6-122111 (EP 0590523A2) discloses that a carbon black powder was charged into a closed molding container, and after reducing the pressure in the container, the pressure in the container was restored to atmospheric pressure to impart a specific shape to the carbon black. However, the pressure which can be exerted by reduced pressure was not higher than 1 atm at best, and the molded product of carbon black was very soft, and it was likely that edges of the molded product underwent breakage, or the molded product underwent powdering during transportation or storage. Thus, such a method was not adequately qualified for an industrial operation.

The present inventors have conducted an extensive study in view of the above problems and, as a result, have found that by forming carbon black into a carbon black aggregate having a certain specific hardness or by forming carbon black into an aggregate wherein the hardness of the surface and the hardness of the interior are in a specific relation, powdering can be suppressed, and surprisingly, the dispersibility in a vehicle is rather improved, and the product can be made to be suitable for use. Further, it has been found that by applying wrapping to such a carbon black aggregate, it is possible to completely prevent environmental pollution during use. The present invention has been accomplished on the basis of these discoveries. Namely, the present invention resides in a carbon black aggregate or the like having a surface hardness of at least 70 g, etc.

The reason is not clearly understood as to why the carbon black aggregate of the present invention has adequate hardness, dusting can be prevented, and it is not only suitable for handling but also excellent in the dispersibility in a vehicle. However, it is considered that air among carbon black particles is uniformly deaerated so that carbon black particles are aggregated uniformly without no substantial irregularity in density, so that the dispersibility in a vehicle is also improved.

Now, the present invention will be described in detail.
Carbon black aggregate

The carbon black aggregate of the present invention is one having a surface hardness of at least 70 g. Preferably, the hardness of the surface is higher than the hardness of the interior. Here, the hardness is the value measured by a spring type hardness meter (SHORE A) as stipulated in ASTM D-2240.

The hardness of the surface is the value obtained by measuring the surface of the carbon black aggregate by the above method. The hardness of the interior is the hardness of a portion which is at least 5 mm inside of the surface of the carbon black aggregate. The hardness of the interior can be obtained by cutting the carbon black aggregate and measuring the hardness of the cut surface by the above method.

The position for measuring the hardness is not particularly limited, and measurement may be made at a position appropriate for measuring an average information of the aggregate. In a case where fluctuations are large, measurements may be made at a plurality of positions, and their mean value may be taken. For example, in a case where the aggregate is a rectangular parallelepiped, the hardness values at the center positions of the respective six faces may be measured, and their mean value may be calculated. In a case where the aggregate is cylindrical, the hardness values at the center positions of the top and bottom two circular faces may be measured, and their mean value may be calculated.

In the present invention, the carbon black aggregate is one wherein a plurality of primary particles of carbon black are aggregated, which has a volume sufficiently large so that the hardness can be measured by ASTM D-2240. Since conventional granulation product and flake product are much smaller than the aggregate of the present invention, the hardness of those conventional product can not be measured by ASTM D-2240. Accordingly, the aggregate of the present invention has a size sufficiently large so that behavior of the aggregate is quite different from those of conventional powder product, granulation product and flake product. Therefore, various problems attributable to conventional product could be solved.

If the hardness of the carbon black aggregate is less than 70 g, powdering or breakage is likely to occur during handling of the aggregate, and the aggregate is susceptible to disintegration during transportation and thus has no adequate strength for use. The surface hardness of the carbon black aggregate is not particularly limited so long as it is at least 70 g, and it is preferably from 100 to 2,000 g, more preferably from 200 to 1,500 g, most preferably from 300 to 800 g. In this range, the dispersibility in a vehicle is particularly excellent, whereby it can easily be dispersed in a vehicle when it is used as a pigment for an ink or a coating material. When it is used for preparation of a rubber composition, it is mixed with a strong force by a Banbury mixer or the like, whereby the dispersibility scarcely becomes a problem, and a higher hardness may be acceptable without any problem. Thus, the hardness may suitably be selected depending upon the particular application.

The carbon black aggregate of the present invention may be such that the hardness of the surface is higher than the hardness of the interior. More preferably, the hardness of the surface is higher by from 1.05 to 1.50 times the hardness of the interior. In a case where the hardness of the interior fluctuates, the hardness at a position of 5 mm inside from the surface shall be adopted.

The carbon black to be used, is not particularly limited. For example, lamp black, acetylene black or furnace black may be used. Furnace black which is commonly used, can be made to have a small particle size and a small structure, and when used for various colored compositions, it provides excellent characteristics which are believed to be attributable to the characteristics of the functional groups at its surface. On the other hand, it has had a serious problem of powdering and dusting. Accordingly, application of the present invention to such furnace black has a substantial significance from the industrial viewpoint.

The method for preparing the carbon black aggregate is not particularly limited. However, to obtain a carbon black aggregate having the optimum hardness, it is preferred to employ a method of placing carbon black in a slidable mold and aggregating it by pressing. The method for preparing the carbon black aggregate is not particularly limited so long as it is a method capable of producing an aggregate of which the hardness of the interior is low and the hardness of the surface is high. However, the aggregate of the present invention can readily be prepared, for example, by the following method. Namely, carbon black is filled in a slidable mold and pressed at a pressing rate of at least 0.1 kgf/cm$^2$ every minute, preferably from 1 to 500 kgf/cm$^2$ every minute to aggregate the carbon black, whereby the hardness of the surface will be high and the hardness of the interior will be low, and thus the carbon black aggregate of the present invention can readily be obtained.

As apparatus to be used for pressing, various press molding machines including a hydraulic press machine and an air cylinder press machine, may be employed.

Here, the material of the slidable mold into which the carbon black is put, is not particularly limited, and molds made of various metals, ceramics and resins may be employed. The pressure for aggregating the carbon black is preferably exerted directly from the mold which is solid. For example, in a case where carbon black is pressed by a gas surrounding the carbon black, as in JP-A-6-122111, it will be difficult to form the surface having adequate hardness as the carbon black aggregate of the present invention.

The size of the carbon black aggregate of the present invention is not particularly limited, and it may be at such a level that the hardness can be measured by the method stipulated in ASTM D-2240. Particularly preferably, the aggregate is a block having a volume of at least about 1 cc. If the volume of the aggregate is smaller than 1 cc, the aggregate itself tends to scatter, thus leading to environmental pollution, even if the aggregate has the prescribed hardness.

The shape of the aggregate is not particularly limited and may be an optional shape such as a rectangular parallelpiped, cubic, cylindrical or spherical shape, depending upon the particular purpose and particular mode of use.

The carbon black aggregate may have perforations and/or recesses. Here, the shape and size of perforations are not particularly limited and may be suitably selected depending upon the particular purpose. Specifically, for example, for the purpose of connecting a plurality of carbon black aggregates by passing a connecting medium such as a string, a rope or a chain through perforations of the respective aggregates in order to prevent collapse of piled aggregates during transportation or storage, the perforations may be such that such a connecting medium can pass therethrough. On the other hand, for the purpose of readily disintegrating the aggregate to disperse it in a vehicle for e.g. an ink or a coating material by forming perforations, such perforations may preferably be relatively large. Otherwise, by forming perforations or recesses, fine adjustment of the weight of the carbon black aggregate can be facilitated. In such a case, perforations may be formed by a perforating means having a tubular blade, so that the amount of carbon black removed as perforations can easily be determined from the cross-sectional area of the tubular blade. Accordingly, by forming a necessary number of perforations, fine adjustment of the amount of carbon black can easily be carried out.

The size and shape of the recesses are likewise not particularly limited, and the recesses are acceptable so long as they form dents. For example, it is effective to form a concave and a convex to a carbon black aggregate, so that the concave of one aggregate will fit the convex of another aggregate, so that when a plurality of aggregates are piled, collapse of the piled aggregates can effectively be prevented. By providing various different concaves and convexes, they may be used as means to identify the types of carbon black.

A method for providing such perforations or recesses is not particularly limited. For example, a carbon black aggregate of a certain specific shape may be engraved by e.g. a cutter, or when an aggregate is to be molded, a mold having a protrusion may be employed, so that a carbon black aggregate having a recess can be formed.

Otherwise, a so-called cutting line may be formed as a recess to improve disintegration when the aggregate is put into a mixing tank, i.e. to improve the dispersibility of carbon black when it is mixed with a vehicle, to simplify the dispersing step, to save the labor for weighing or to improve weighing efficiency. For example, by providing a trapezoidal regular concave/convex pattern, the carbon black aggregate can be made readily dividable into the respective blocks.

By making the shape of the carbon black aggregate to be a spherical, cylindrical or octahedral or higher polyhedral shape, or a pentagonal or higher polygonal prism, the aggregate may be made to have an excellent rolling property, whereby its transportation will be easy. Especially when it is made to have a shape of a regular hexagonal prism, it will be excellent in the rolling property, and at the same time it will be excellent in the stability when a number of such aggregates are piled. Further, various shapes may be selected so that the transportation or introduction into a hopper, a tank or the like will be facilitated. The carbon black aggregate of the present invention has adequate hardness. Accordingly, during usual handling, it will be free from a damage by cracking or breakage or free from environmental pollution due to rupture of the covering, even when tumbled, thrown or piled, and it can readily be formed into various desired shapes and can be maintained in such shapes. On the other hand, for preparation of various carbon black-containing compositions, the aggregate may be formed to have excellent properties so that it can readily be dispersed and mixed by a conventional mixing means, whereby the operation efficiency can be remarkably improved in all phases where carbon black is employed.

Thus, with the carbon black aggregate of the present invention, an optional shape can be selected for use.

Further, the carbon black aggregate of the present invention may be made to have a resin or other various additives incorporated in addition to carbon black. In such a case, the amount of such additives is usually at most 5 wt %, preferably at most 3 wt %. The timing for such addition is not particularly limited. However, for example, when the carbon black powder is put in a mold, followed by pressing, in the above-mentioned process, if the one having such additives incorporated, is subjected to pressing, the operation will be simple.

The density of the carbon black aggregate (i.e. the value obtained by dividing the mass of the aggregate by the volume of the aggregate) is not particularly limited. However, particularly preferably, the density σ (g/cc) is within the following range:
at least $$\sigma = 8.190 \times 10^{-3} D - 3.824 \times 10^{-3} L + 0.516$$

and at most $$\sigma = 3.265 \times 10^{-3} D - 3.334 \times 10^{-3} L + 1.173$$

more preferably, at least $$\sigma = 8.686 \times 10^{-3} D - 4.031 \times 10^{-3} L + 0.543$$

and at most $$\sigma = 3.123 \times 10^{-3} D - 3.189 \times 10^{-3} L + 1.072$$

Within this range, the aggregate will be excellent in the handling efficiency and in the dispersibility at the time of preparing an ink, a coating material or the like, and the resulting coating material, ink or the like will be particularly excellent in blackness.

In each of the above formulae, D is the arithmetic mean particle size (nm) of carbon black by an electron microscope, i.e. the value obtained by the following method.

Namely, carbon black is put in chloroform and dispersed by application of supersonic waves of 200 KHz for 20 minutes, and then the dispersed sample is fixed on a supporting film. The film is photographed by a transmission electron microscope, and a particle size is calculated by the diameter on the photograph and the magnification of the photograph. This operation is carried out over about 1,500 times, and an arithmetic mean of such values is taken as the particle size.

L is the DBP oil absorption (ml/100 g) as measured by the method in accordance with JIS K6221-1982.

Carbon black aggregate having cracks formed

In the present invention, it is particularly preferred to have cracks formed in the above aggregate. It is thereby possible to increase the contact area of the aggregate with a dispersing medium to facilitate the penetration and uniform distribution of the liquid component in the powder, when various colored compositions are to be prepared, for example, when the powder component is dispersed in a liquid medium such as a liquid varnish or a molten rubber resin to be used for preparation of an ink or a coating material, and thus, the effect of the present invention is believed to be obtained. Namely, it is considered that the liquid component will penetrate from the cracks formed in the aggregate, or, although the aggregate maintains a certain shape by the covering, when put into the liquid component, the covering will break or mix with the liquid component, and the content i.e. the aggregate will disintegrate and disperse, thus contributing to improvement of the dispersibility.

The degree of cracks can be defined by a particle size measured by the following measuring method. Namely, 100 g of a molded powder product having cracks formed, is put on a sieve having a diameter of 200 mm and shaked for one minute while exerting an impact by a shaking machine in accordance with JIS K-6221. The results are plotted on a Rosin-Rammlar diagram, and the median diameter is taken as a mean particle size.

The mean particle size thus measured, is preferably from 0.1 to 50 mm, more preferably from 0.2 to 30 mm. If the mean particle size is smaller than 0.1 mm, the effect of molding to prevent dusting tends to be lost, and dusting is likely to occur. On the other hand, if the mean particle size exceeds 50 mm, it tends to take a long time for a liquid component such as a varnish or a molten polymer to penetrate to the center portion of the aggregate, and consequently, it tends to be difficult to obtain high dispersibility. As is evident from the above method for measuring the degree of cracks, the cracks in the present invention include not only a case wherein in the covering, the aggregate is present as completely divided into a plurality, but also a case wherein so-called "cracking" is imparted to a unitary continuous body, and thus they correspond to cracks whereby the aggregate can be divided into a plurality of particles by the above measuring method.

In the present invention, a method for imparting cracks is not particularly limited. It is possible to employ, for example, a method of imparting vibration to the aggregate, a method of forming cracks by pressing the aggregate, or a method of forming cracks by bending the aggregate.

Covering

In the present invention, the above-described carbon black aggregate is covered. The material of the covering is not particularly limited, so long as it is capable of covering the carbon black aggregate. However, it is preferred to cover the aggregate with a component which is free from any problem even when it is dissolved in or mixed with a solvent to be mixed with the aggregate, or a carbon black-containing composition such as an ink, a coating material, a resin or a rubber, as the intended product. By selecting such a material, it is possible to mix the covered aggregate with other components without removing the covering, to prepare a carbon black-containing composition, whereby dusting can be completely suppressed. Here, the "covering" means to cover the carbon black aggregate to seal it from outside to such an extent that scattering or dusting of carbon black can substantially be prevented, and it includes not only packaging by a sheet material, such as wrapping, shrink packaging or vacuum packing, but also a covering by coating, formed by coating a film-forming component such as a curable liquid material such as a resin composition. Typically, it is preferred to use a resin film made of a polymer compound such as a resin, since it has strength and flexibility durable against a force exerted when cracks are imparted to the aggregate, it has solubility in a carbon black-containing composition such as an ink, a coating material, a resin or a rubber, and it is convenient for packaging. For example, for application to an ink, an ethylene/vinyl acetate copolymer (hereinafter referred to as EVA), ethylcellulose, a phenol resin, an alkyd resin, an acrylic resin, a polyamide resin, or a super low density polyethylene may, for example, be used.

For application to a coating material, EVA, a polystyrene or a super low density polyethylene may, for example, be mentioned. In the field of a water-soluble ink or a water-soluble coating material, polyvinyl alcohol or polyethylene oxide may, for example, be mentioned. For application to a resin, polystyrene, EVA or polyethylene may, for example, be mentioned. For application to a rubber, polyethylene or EVA may, for example, be mentioned. The material may suitably be selected depending upon the particular application.

In order to use such a resin as a covering film, an additive may be incorporated up to predetermined amount. For example, in order to prevent blocking of the film by itself, an inorganic filler such as silica or talc may be incorporated as a blocking preventive agent in an amount of less than 5 wt %. Or, less than 1 wt % of a slip agent, less than 0.5 wt % of an antioxidant or less than 0.1 wt % of a neutralizing agent may also be incorporated. Further, a polymer soluble in an ink, a coating material, a resin or a rubber to be used, may be added as the case requires.

The method for covering in the present invention is not particularly limited and may, for example, be pillow type packaging such as vertical pillow type packaging or horizontal pillow type packaging, film packaging such as shrink packaging, vacuum packaging, stretch packaging skin packaging or fold wrapping, box packaging such as overwrapping, carton packing or portion pack, blister packaging, or skin packer. Further, a coating film may be formed on the surface of the carbon black aggregate by coating by means of e.g. a spray, an air doctor coater, a blade coater, a rod coater, a knife coater or an impregnation coater, and such a coating film is used as the covering. Preferably, a carbon black aggregate is formed and then covered by a method whereby a film will closely contact the aggregate so that there will be substantially no space between the aggregate and the packaging, such as shrink packaging, pillow type packaging, fold wrapping, vacuum packaging or coating. If cracks are imparted by the above-described physical force to the aggregate after covering the aggregate by such a method, the film helps the shape-maintaining property of the aggregate even after imparting cracks, whereby piling can be facilitated for transportation or storage. It is particularly preferred to form a covering which closely fits on the carbon black aggregate, by vacuum packaging, shrink packaging or coating with a curable liquid having a film-forming property among such methods, whereby deterioration in quality by e.g. oxidation from the surface of the molded product can be prevented, the strength can be improved, the handling efficiency can be improved, the costs for transportation and storage can be reduced, and formation of the covering can be facilitated. The method for coating is not particularly limited, but a coating means such as a spray, an air doctor coater, a blade coater, a rod coater, a knife coater or an impregnation coater, may, for example, be mentioned.

Especially for the purpose of protecting the surface and maintaining the shape of the carbon black aggregate, the aggregate may preliminarily be covered with a heat shrinkable material, followed by heating to closely contact the covering. Usually, however, the aggregate may be covered with a material which is not heat shrinkable. Depending upon the particular purpose, aggregate may be covered with a porous material or cloth.

Formation of a covering by heat shrink packaging with a heat shrinkable material has merits such that close contact of the covering to the carbon black can be easily accomplished, and the shape-maintaining property can be improved. On the other hand, fine pores will be formed in the covering from deaeration during heat shrinkage. Depending upon the particular application or mode of use, it is preferred to coat a liquid resin to cover these pores, to close these pores with a film or to provide a double packaging, to close the pores so as to substantially prevent leakage of carbon black with a view to completely preventing pollution.

The degree of covering is not particularly limited and may suitably be selected depending upon the particular use, transportation or storage environment. For example, coverings by means of various film-forming resins, paper, etc. are typical. However, the covering is not limited to such typical examples, and various materials, for example porous materials, may be employed, and it is not necessary to cover the entire surface of the aggregate. Likewise, it is not necessary that the covering is closely in contact with the aggregate. The thickness of the covering is not particularly limited, and it is usually from 5 to 500 $\mu$m. To cover with a sheet material, the thickness is preferably from 10 to 50 $\mu$m, and to apply a coating with a curable material, the thickness is preferably from 50 to 100 $\mu$m. However, the thickness is not limited to such ranges, so long as the covering accomplishes the desired purpose.

In the case of coating, the coating material may be dissolved in a solvent or heat-melted, so that a liquefied material may be used for coating of the carbon black aggregate.

The packaging may not necessarily be hermetically sealed and may have an appropriate form depending upon the particular purpose, working environment, etc.

Further, the above-described carbon black aggregates having a covering may further be packaged (hereinafter sometimes referred to as secondary packaging). For example, a plurality of packaged carbon black aggregates may be packaged in a unitary body, so that the transportation cost can substantially be reduced. Or, when a covering is applied to a carbon black aggregate by means of a soluble material which will be described hereinafter, if this covering is stained with soil or dust, and if the aggregate is put into a mixing tank without removing this covering, the resulting carbon black-containing composition such as an ink or coating material, will contain such soil or dust. Accordingly, depending upon the application or mode of use, the secondary packaging is effective. The means, material, etc. for the secondary packaging are not particularly limited, and common various packaging methods may be employed. Specifically, stretch packaging such as pallet stretch packaging or pallet shrink packaging, or shrink packaging, may be mentioned as a typical example.

By covering the carbon black aggregate as described above, it is possible to prevent environment pollution by dusting which is otherwise likely to take place when carbon black is used. Namely, it is possible to completely screen a user from the carbon black, and it is possible to accomplish complete prevention of ambient pollution due to dusting during its use. In particular, by covering with a material soluble in or miscible with an ink, a coating material, a resin or a rubber as the intended carbon black-containing composition (hereinafter referred to as a "soluble material"), the covered aggregate may be put into a mixing tank without removing the covering, and carbon black as fine powder can be used without bringing about environmental pollution, and such is very desirable also from the viewpoint of operation efficiency. Further, such is effective to prevent breakage of the carbon black aggregates during transportation.

Here, "soluble" means substantially soluble, but is not limited to completely soluble to such an extent that no solid will remain, but may be such that a fine solid content may be contained so long as the material can be uniformly mixed to such an extent that no adverse effects will be given to the property of the desired carbon black-containing composition. Further, "miscible" means that the material is miscible to a uniform state on appearance.

Further, handling efficiency during the transportation will thereby be improved. As the carbon black aggregate of the present invention has adequate strength, various means may be employed for covering it. The obtained covered carbon black aggregate has a further improved strength, so that it is free from breakage. The covering can readily be formed in close contact with the carbon black aggregate, and the thickness of the covering can also be optionally adjusted. Therefore, it is readily possible to improve the strength or the shock absorbing property by properly selecting the covering material, and it is possible to effectively prevent breakage of the carbon black aggregates during transportation.

Further, the density of the carbon black portion is sufficiently high so that the transportation and storage costs can substantially be reduced, and deaeration among particles can sufficiently be carried out, so that the dispersibility in a vehicle is particularly excellent. For example, by a method of packing a powder in a bag, followed by deaeration, it is difficult to sufficiently withdraw air among particles and to bind carbon black particles to one another to such an extent to form a carbon black aggregate. Namely, during vacuuming, the vacuuming system tends to suction the powder, whereby air can not adequately be withdrawn. Further, by this method, pressing is carried out by atmospheric air, whereby no adequate volume reduction can be carried out, and such is still inadequate to diminish the bulky state. Further, even if the entire bag is subjected to pressing, no adequate pressure will be exerted to carbon black, whereby it can hardly be made into an aggregate which maintains a specific shape. Accordingly, heretofore, there has been no carbon black molded product having a packaging, especially the one providing excellent properties. Whereas, the carbon black aggregate of the present invention can readily be produced by the above-described method.

In the present invention, carbon black in the covering is in the form of a specific aggregate, whereby the following problems can be solved. Namely, firstly, even if a packaging bag made of a soluble material is used for packaging, and carbon black is mixed as packaged by the bag, if the carbon black is not formed into an aggregate of the present invention, when it is put in a container for preparation of e.g. an ink or a coating material so that the resin film will dissolve and the carbon black powder is released from the packaging bag, the powder itself has poor compatibility with the liquid, whereby the powder is likely to be dusted by stirring vanes or exhaust blowers provided in the production apparatus, thus leading to environmental pollution. Secondly, the carbon black powder has a low bulk density, and it is not suitable for transportation or storage when packaged with a resin film in an air-containing state. Thirdly, carbon black which is a fine powder containing air, is hardly dispersible in an ink, in a varnish for a coating material or in a molten resin or rubber. With the carbon black aggregate of the present invention, these problems have been solved.

The material for the covering is not particularly limited. For example, a polystyrene, or an alkyd resin such as an aliphatic acid-modified alkyd resin, a rosin-modified alkyd resin, a linseed oil-modified alkyd resin, a dehydrated castor oil-modified alkyd resin, a soybean oil-modified alkyd resin, a phthalic alkyd resin or a styrene-modified alkyd resin, may be mentioned. An amino-alkyd resin such as a urea-melamine resin, a urea resin, a melamine resin or a benzoguanamine resin may, for example, be mentioned. A polyester resin or an epoxy resin such as an epoxy-phenol resin, an epoxy-amino resin, an epoxy-amine resin, an epoxy-amide resin, an epoxy resin ester or an epoxy-isocyanate resin, may, for example, be mentioned. A polyurethane resin or a silicone resin such as an alkyd-modified silicone resin, an epoxy-modified silicone resin or a phenol-modified silicone resin, may, for example, be mentioned. A xylene resin such as a methaxylene-formaldehyde resin, a phenol-modified xylene resin, a rosin-modified phenol resin, an aliphatic acid-modified phenol resin, a 100% phenol resin, a modified phenol resin or a phenol resin, may, for example, be mentioned. An acrylic resin such as a nitrocellulose-modified acrylic resin, a cellulose acetate butyrate-modified acrylic resin, an alkyd-modified acrylic resin, a polyacrylamide, a polyacrylic acid, a polyacrylic acid ester, a polyacrylonitrile, a polyacrylonitrile ester, a polystyrene, a polymethacrylamide, a polymethacrylic acid, a polymethacrylic acid ester or a polymethacrylonitrile, may, for example, be mentioned. A vinyl acetate resin, a vinyl chloride resin, or a polyolefin, for example, a polyethylene such as chlorinated polyethylene, chlorosulfonated polyethylene, high molecular weight polyethylene, low molecular weight polyethylene, high density polyethylene, medium density polyethylene, low density polymethylene, super low density polyethylene or low molecular weight polyethylene homopolymer type, or a polypropylene such as chlorinated polypropylene or low molecular weight polypropylene, may, for example, be used. A urethane resin, a vinyl chloride resin, a butyral resin, a vinylidene chloride resin, or a latex such as natural rubber, SBR rubber, butyl rubber, chloroprene, neoprene, hydrochlorinated rubber or cyclized rubber, may, for example, be used. A rosin resin such as gum rosin, wood rosin, tall oil rosin, a rosin-modified maleic acid resin, or a styrene-modified maleic acid resin, may, for example, be used. A cellulose such as alkali cellulose, cellulose ester, cellulose acetate, cellulose acetate butyrate, cellulose xanthate, cellulose nitrate, cellulose ether, carboxymethylcellulose, cellulose ether ester, methylcellulose, ethylcellulose, ethylhydroxyethylcellulose, hydroxypropylcellulose, hydroxyethylcellulose, regenerated cellulose, celluloid or nitrocellulose, may, for example, be used. A polyvinyl ester such as polyvinyl alcohol, polyvinyl cinnamate, polyvinyl acetate, polyvinyl propionate, polyvinyl stearate, polyvinyl butyral, polyvinyl formal or polyvinyl pyrrolidone, may, for example, be used. A polyvinyl ether such as polyisobutylvinyl ether or polymethylvinyl ether, may, for example, be used. A polysulfone such as polyether sulfone or polysulfone amide, may, for example, be used. A fluorine resin such as FEP, polychlorotrifluoroethylene, polytetrafluoroethylene, polyvinylidene fluoride or polyvinylfluoride, may, for example, be used. A polyamide, such as an aliphatic polyamide such as nylon 11, nylon 12, nylon 6, nylon 610, nylon 612 or nylon 66, a polyphenylene terephthalamide, a polyamide-imide or a polyamide, may, for example, be used. As an amino resin, an aniline resin, a urea resin, polysulfone amide or a melanine resin may, for example, be used. As an allyl resin, CR-39 or a diallyl phthalate resin may, for example, be used. As a phenol resin, a novolak resin or resorcinol resin may, for example, be used.

As other resins, a polyallylate, a polyethylene terephthalate, a polyvinylidene chloride, a polyvinyl chloride, a polycarbonate, an ABS resin, an ionomer, a chlorinated polyether, a cumarone-indene resin, a polyphenylene oxide, a polybutylene terephthalate, a polymethylstyrene, a polymethylene, an unsaturated polyester resin, a furan resin, a polyvinyl stearate, gum arabic, copal gum, a diallyl phthalate resin, a urea resin, a melanine resin, a butadiene resin, a polybutylene terephthalate, a petroleum resin, gilsonite, a modified alkyd resin, shellac, dammar, starch, a saccharide or a liquid crystal polymer, may, for example, be used. As a water-soluble resin, polyvinyl alcohol, polyethylene oxide, dextrin, polysodium acrylate, polyacrylamide, gelatin, chitosan, casein, collagen, egg albumen, sea weed, carageenan, sodium arginate, agar, xanthan gum or pluran, may, for example, be used.

As copolymers, the following resins may, for example, be used. Namely, a low molecular weight polyethylene/acrylic acid copolymer, a low molecular weight polyethylene/vinyl acetate copolymer, an ethylene/vinyl acetate copolymer, a methylvinyl ether/maleic acid copolymer, an ethylene/ethyl acrylate copolymer, an ethylene/methacrylic acid random polymer, an ethylene/acrylic acid copolymer, an ethylene/ethylene acrylate copolymer, an ethylene/vinyl chloride copolymer, a vinyl chloride/vinyl acetate copolymer, an ethylene/vinyl acetate/vinyl chloride graft resin, an ethylene/vinyl alcohol copolymer, a carboxy vinyl copolymer, a polyacetal, an N-vinylpyrrolidone/vinyl acetate copolymer, or a methyl vinyl ether/vinyl acetate copolymer, may, for example, be used.

Otherwise, when a backing paper for a photographic film, a wrapping paper for a photosensitive material or a black paper such as black flock paper, is to be prepared, the carbon black aggregate may be covered with paper.

Soluble material

As particularly preferred covering materials, soluble materials of the above-described various synthetic resins may be mentioned. More specifically, for application to coating materials, super low density polyethylene, wax, polystyrene, an alkyd resin such as a phthalic alkyd resin or a styrene-modified alkyd resin, an amino-alkyd resin such as a urea-melamine resin, a urea resin, a melamine resin or a benzoguanamine resin, a polyester resin, an epoxy resin such as an epoxy-phenol resin, an epoxy-amino resin, an epoxy-amine resin, an epoxy-amide resin, an epoxy resin ester or an epoxy-isocyanate resin, a polyurethane resin, a silicone resin such as an alkyd-modified silicone resin, an epoxy-modified silicone resin or a phenol-modified silicone resin, a xylene resin such as a methaxylene-formaldehyde resin, a phenol-modified xylene resin, a rosin-modified phenol resin or a fatty acid-modified phenol resin, a vinyl acetate resin, a vinyl chloride resin, an acrylic resin such as a nitrocellulose-modified acrylic resin, a cellulose acetate butyrate-modified acrylic resin or an alkyd-modified acrylic resin, a latex such as SBR rubber, butyl rubber, chloroprene or neoprene, a rosin resin such as gum rosin, wood rosin or tall oil rosin, or a water-soluble resin such as polyvinyl alcohol, polyethylene oxide, carboxymethylcellulose, hydroxypropylmethylcellulose, hydroxyethylcellulose, dextrin, a methyl vinyl ether/maleic acid copolymer, polysodium acrylate, polyacrylamide, gelatin, chitosan, shellac, casein, collagen, egg albumen, sea weed, carageenan, sodium arginate, agar, xanthan gum or pluran, may, for example, be mentioned. For application to inks, a rosin resin such as gum rosin, wood rosin or tall oil rosin, a phenol resin such as a 100% phenol resin or a modified phenol resin, a modified alkyd resin such as a fatty acid-modified alkyd resin, a rosin-modified alkyd resin, a linseed oil-modified alkyd resin, a dehydrated castor oil-modified alkyd resin or a soybean oil-modified alkyd resin, a petroleum resin, a rosin-maleic acid, resin, a cyclized rubber, casein, shellac, a rosin-modified maleic acid resin, nitrocellulose, a polyamide resin, a chlorinated polypropylene, a urethane resin, an epoxy resin, an acrylic resin, a polyvinyl chloride, a vinyl chloride-vinyl acetate copolymer, a butyral resin, a vinylidene chloride resin, a polyolefin such as a low molecular weight polyethylene, a low density polyethylene, a high density polyethylene, a super low density polyethylene, wax, a low molecular weight polyethylene homopolymer, a low molecular weight polyethylene/acrylic acid copolymer, a low molecular weight polyethylene/vinyl acetate copolymer or a low molecular weight polypropylene, may, for example, be mentioned.

For application to color a resin, it is preferred to employ a resin which, even when coated or mixed with the resin to be colored, gives no adverse effect to its properties such as strength or good appearance. Specifically, an ABS resin or an acrylic resin such as polyacrylamide, polyacrylic acid, polyacrylic acid ester, polyacrylonitrile, polyacrylonitrile ester, styrene, polymethacrylamide, polymethacrylic acid, polymethacrylic acid ester or polymethacrylonitrile, may be mentioned. An ionomer, a chlorinated polyether, a cumarone-indene resin, a regenerated cellulose or a petroleum resin may be used. As a cellulose derivative, alkali cellulose, cellulose ester, cellulose acetate, cellulose acetate butyrate, cellulose xanthate, cellulose nitrate, cellulose ether, carboxymethylcellulose, cellulose ether ester, methylcellulose, ethylcellulose, ethylhydroxyethylcellulose, hydroxypropylcellulose, hydroxyethylcellulose or celluloid, may, for example, be used. As a fluorine resin, FEP, polychlorotrifluoroethylene, polytetrafluoroethylene, polyvinylidene fluoride or polyvinyl fluoride, may, for example, be used. As a polyamide, an aliphatic polyamide such as nylon 11, nylon 12, nylon 6, nylon 610, nylon 612 or nylon 66, a polyphenylene terephthalamide, a polyamideimide, a polyamide acid, may, for example, be used. A polyallylate, a polyethylene terephthalate, a polyvinylidene chloride or a polyvinyl chloride may be used. As a polyolefin, a polyethylene such as chlorinated polyethylene, chlorosulfonated polyethylene, high molecular weight polyethylene, low molecular weight polyethylene, high density polyethylene, medium density polyethylene, low density polyethylene, super low density polyethylene or LLDPE, a polybutene such as polyisobutylene, or a polypropylene, may, for example, be used. A polycarbonate, a polystyrene or a polysulfone such as polyethersulfone or polysulfonamide, may, for example, be used. A polyvinyl alcohol, or a polyvinyl ester such as polyvinyl cinnamate, polyvinyl acetate, polyvinyl propionate, polyvinyl stearate, polyvinyl butyral, polyvinyl formal or polyvinyl pyrrolidone, may, for example, be used. A polyvinyl ether such as polyisobutylvinyl ether or polymethylvinyl ether, a polyphenylene oxide, a polybutylene terephthalate, a polypropylene, a polymethylstyrene or a polymethylene, may, for example, be used. A polyethylene oxide, a polyvinyl stearate, hydrochloric rubber, cyclized rubber, gum arabic, copal gum, a polyurethane resin, a diallyl phthalate resin, a urea resin, a melanine resin, a urethane resin, a butadiene resin, a polybutylene terephthalate, a rosin resin, a petroleum resin, gilsonite, an alkyd resin, a modified alkyd resin, shellac, dammar, a rosin-modified maleic acid resin, a styrene-modified maleic acid resin, nitrocellulose, casein, starch, a saccharide, an ABS resin or a liquid crystal polymer, may, for example, be mentioned.

Further, a copolymer such as an ethylene/vinyl acetate copolymer, an ethylene/ethyl acrylate copolymer, an ethylene/methacrylic acid random polymer, an ethylene/acrylic acid copolymer, an ethylene/ethylene acrylate copolymer, an ethylene/vinyl chloride copolymer, an ethylene/vinyl acetate/vinyl chloride graft resin, an ethylene/vinyl alcohol copolymer, a carboxyvinyl copolymer, a polyacetal, an N-vinylpyrrolidone/vinyl acetate copolymer or a methylvinyl ether/vinyl acetate copolymer, may, for example, be mentioned.

As a thermosetting resin, an amino resin such as an aniline resin, a urea resin, a polysulfone amide or a melanine resin, an allyl resin such as CR-39 or a diallyl phthalate resin, an alkyd resin, an epoxy resin, a silicone resin or a vinyl ester resin, may, for example, be used. A phenol resin such as a novolak resin or resorcinol resin, an unsaturated polyester resin or a furan resin, may, for example, be mentioned.

For application to rubbers, an ABS resin, or an acrylic resin such as polyacrylamide, polyacrylic acid, polyacrylic acid ester, polyacrylonitrile, polyacrylonitrile ester, styrene, polymethacrylamide, polymethacrylic acid, polymethacrylic acid ester or polymethacrylonitrile, may be mentioned. An ionomer, a chlorinated polyether, a cumarone-indene resin, a regenerated cellulose or a petroleum resin may be mentioned. As a cellulose derivative, alkali cellulose, cellulose ester, cellulose acetate, cellulose acetate butyrate, cellulose xanthate, cellulose nitrate, cellulose ether, carboxymethylcellulose, cellulose ether ester, methylcellulose, ethylcellulose, ethylhydroxyethylcellulose, hydroxypropyl cellulose, hydroxyethylcellulose or celluloid, may, for example, be mentioned. As a fluorine resin, FEP, polychlorotrifluoroethylene, polytetrafluoroethylene, polyvinylidene fluoride or polyvinyl fluoride, may, for example, be mentioned. As a polyamide, an aliphatic polyamide such as nylon 11, nylon 12, nylon 6, nylon 610, nylon 612 or nylon 66, a polyphenylene terephthalamide, a polyamideimide, a polyamide acid, may, for example, be mentioned. A polyallylate, a polyethylene terephthalate, a polyvinylidene chloride or a polyvinyl chloride may be mentioned. As a polyolefin, a polyethylene such as chlorinated polyethylene, chlorosulfonated polyethylene, high molecular weight polyethylene, low molecular weight polyethylene, high density polyethylene, medium density polyethylene, low density polyethylene or LLDPE, a polybutene such as polyisobutylener or polypropylene, may be used. A polycarbonate, a polystyrene, or a polysulfone such as polyethersulfone or polysulfonamide, may, for example, be mentioned. A polyvinyl alcohol, or a polyvinyl ester such as polyvinyl cinnamate, polyvinyl acetate, polyvinyl propionate, polyvinyl stearate, polyvinyl butyral, polyvinyl formal or polyvinyl pyrrolidone, may, for example, be used. A polyvinyl ether such as polyisobutylvinyl ether or polymethylvinyl ether, a polyphenylene oxide, a polybutylene terephthalate, a polypropylene, a polymethylstyrene or a polymethylene, may be mentioned. A polyethylene oxide, a polyvinyl stearate, hydrochloric rubber, cyclized rubber, gum arabic, copal rubber, a polyurethane resin, a diallylphthalate resin, a urea resin, a melanine resin, a urethane resin, a butadiene resin, a polybutylene terephthalate, a rosin resin, a petroleum resin, gilsonite, an alkyd resin, a modified alkyd resin, shellac, dammar, a rosin-modified maleic acid resinr a styrene-modified maleic acid resin, nitrocellulose, casein, starch, a saccharide, an ABS resin, or a liquid crystal polymer, may, for example, be mentioned.

Further, a copolymer such as an ethylene/vinyl acetate copolymer, an ethylene/ethyl acrylate copolymer, an ethylene/methacrylic acid random polymer, an ethylene/acrylic acid copolymer, an ethylene/ethylene acrylate copolymer, an ethylene vinyl chloride copolymer, an ethylene/vinyl acetate/vinyl chloride graft resin, an ethylene vinyl alcohol copolymer, a carboxyvinyl copolymer, a polyacetal, an N-vinylpyrrolidone/vinyl acetate copolymer, or a methylvinyl ether/vinyl acetate copolymer, may, for example, be used.

As a thermosetting resin, an amino resin such as an aniline resin, a urea resin, a polysulfonamide or a melanine resin, an allyl resin such as CR-39 or a diallylphthalate resin, an alkyd resin, an epoxy resin, a silicone resin, or a vinyl ester resin, may, for example, be used. A phenol resin such as a novolak resin or a resorcinol resin, an unsaturated polyester resin, a furan resin, may, for example, be mentioned. Further, a mixture of these resins, or the one having various additives incorporated, may be used.

Covering with super low density polyethylene

As a particularly preferred embodiment, the above-described carbon black aggregate covered with a specific polyethylene may be mentioned.

Namely, the packaging is constituted by a polyethylene having a density of at most 0.900 g/cc, more preferably at most 0.880 g/cc. Polyethylene usually includes a high pressure method low density polyethylene, a high density polyethylene, a low density polyethylene and a straight chain low density polyethylene. The densities of these polyethylenes are from 0.91 to 0.93 g/cc in the case of the high pressure method low density polyethylene, from 0.94 to 0.97 g/cc in the case of the high density polyethylene, and from 0.91 to 0.93 g/cc in the case of the linear low density polyethylene. These conventional polyethylenes have high crystallinity and are commonly used as containers for various reagents or food products. However, it has been found by the study of the present inventors that it is difficult to dissolve them in vehicles for inks or coating materials. On the other hand, the above-described specific super low density polyethylene is a polyethylene which has a further lower density than such conventional polyethylenes and one which has been made possible to produce on an industrial scale by developments of the catalyst technology in recent years. Such a super low density polyethylene has merits such that the film transparency can be made high, the heat sealing temperature at the time of covering can be lowered, and the tensile strength can be increased. The present inventors have studied the solubility of this super low density polyethylene in various solvents and have surprisingly found that its solubility in an ink or a coating material is very high. According to the present invention, a pigment is covered with a film of such a super low density polyethylene, whereby it can be introduced into an oven for preparation of an ink or a coating material without necessity to peel off such a polyethylene covering, and thus it is possible to provide a pigment which is extremely effective for prevention of environmental pollution.

Such a super low density polyethylene to be used in the present invention, can be prepared, for example, by means of a catalyst so-called a metallocene catalyst or a Kaminsky catalyst. With such a catalyst, the active sites for polymerization reaction are of a single species, whereby as compared with conventional Ziegler-Natta catalysts, it is easy to control the molecular weight of the polymer or the polymer structure such as branching. As a result, it has been made possible to synthesize a super low density polyethylene.

A method for processing the polyethylene thus obtained to form a film useful as a covering material, is not particularly limited. For example, an inflation molding or a T-die molding may, for example, be employed. Also, the thickness of the film is not particularly limited so long as it has adequate strength for packaging the pigment and for transportation, and it is common to use one having a thickness of from 10 to 100 $\mu$m.

When the polyethylene is formed into film, an antiblocking agent, a slip agent, an antioxidant or a neutralizing agent may be incorporated, as the case requires.

If the above-described super low density polyethylene is used alone for covering, it is most soluble, and even at a low temperature, it will readily dissolve in various vehicles without a problem of reprecipitation. However, it may be used in combination with other covering material depending upon the particular purpose or mode of use. For example, it may be coextruded with a resin component comprising an ethylene-vinyl acetate copolymer as the main component to form a laminate, so that a shrinking property in a transverse direction is imparted so as to facilitate shrink packaging of the pigment, or EVA may be mixed with the super low density polyethylene to increase the melt tension during preparation of a film.

To the covering or the secondary packaging, printing (inclusive of typing) may be applied to print any desired indication. The covering material or the secondary packaging material may preliminarily be printed, and the carbon black aggregate may be covered by such a printed material. Otherwise, printing may be applied after the covering or the secondary packaging has been applied to the carbon black aggregate. For example, an ink jet printer, an ink roll, a hot printer, an imprinting machine or a laser printer may, for example, be employed. A printed label may be pasted. The carbon black aggregate of the present invention has adequate strength, whereby printing or labeling is easy. For example, a color line, a brand name, a product type, a name of manufacturers, a weight of the content, a lot number, a bar code, an illustration, a logo, a color display or a mark may be indicated for commercial distribution.

Further, it is also preferred to impart an identification of the product type to the carbon black aggregate of the present invention by changing the color of the covering material, by attaching a color band which is used for a paper bag for conventional carbon black, or by imparting a design pattern or irregularities to the covering. With respect to the above-described coloring material for printing or the material for identification of the product type such as a label, the material and the amount may suitably be selected depending upon the particular purpose of the carbon black, so that the inclusion will create no problem.

Further, the covering or the secondary packaging may have an opening function. The opening function means a function whereby the covering or the secondary packaging can be opened without using a tool such as a knife or cutter to take out carbon black from the covering or the secondary packaging. Specifically, there may be mentioned a system wherein as in the case of a cigarette packaging, an opening tape is inserted during packaging or covering, so that at the time of opening, the tape is pulled to open the covering or the packaging, a perforation system wherein a perforated film is used for covering or packaging, so that at the time of opening, the film is torn along the perforations, a notch system wherein a V notch is imparted to a film at the time of covering or packaging, so that at the time of opening, the film is torn along the V notch, a label system wherein at the time of opening, a label is pulled so that the film is torn and opened, or a tongue system wherein in pillow packaging, an extra tongue portion is retained in the longitudinal sealing portion, so that at the time of opening, the tongue portion is pulled for opening. For opening of shrink-packaging, the tape system, the label system or the perforation system is preferred. The position for the opening may be at any position so long as the carbon black aggregate can readily be taken out. However, in the label system, a side surface is preferred which is not influential to e.g. stacking.

The carbon black in the covering, as the carbon black aggregate of the present invention, may be an aggregate of carbon black alone, or the aggregate may be formed of carbon black preliminarily mixed with an organic compound. Here, typical examples of the organic compound include a monomer or its polymer, a surfactant and an oil. However, the organic compound is not limited to such specific examples. Especially, additives to a carbon black-containing composition such as a resin composition, a rubber composition, a coating material or an ink, may be preliminarily mixed thereto. The method for mixing such additive components to carbon black is not particularly limited. However, it is not desirable that as in kneading of a rubber composition, the components are compressed by mixing and undergo a phase change from solid to liquid, since it will thereby be difficult to form a carbon black aggregate. The mixing ratio of the organic compound to carbon black is preferably such that the organic compound is at most 50 wt %, preferably at most 20 wt %, more preferably at most 10 wt %. If the amount of the organic compound is too much, especially when the organic compound is liquid, the mixture with carbon black tends to be liquid or clay-like, whereby it will be difficult to prepare a carbon black aggregate having a specific shape.

Covering of pigment

Various pigments can be covered with the above-described polyethylene having a density of at most 0.900 g/cm$^3$. The pigments are not particularly limited. For example, titanium oxide (R-form), titanium oxide (A-form), zinc white, zinc sulfide, lithopone, white lead, lead sulfate, basic lead sulfate, lamp black, acetylene black, carbon black, graphite, bone black, iron oxide lead, antimony lead, cadmium lead, molybdenum lead, silver vermillion, minium, copper subchloride, chrome yellow (reddish), chrome yellow (yellowish), cadmium yellow, zinc yellow, strontium yellow, barium yellow, litharge, ochre, yellow iron oxide, y-hematite, amber, sienna, guinea green, chromium oxide, cobalt green, phthalocyanine green, iron blue, ultramarine blue, cobalt blue, phthalocyanine blue zinc dust, aluminum powder, gold powder, barium sulfate, barium carbonate, calcium carbonate, chalk, magnesium carbonate, gypsum, alumina white, kaolin clay, mica, talc, silica, diatomaceous earth, synthetic diamond, permanent red 4R, watching red, first yellow 10G, disazoyellow, bordeaux 10B, toluidine maroon, peacock blue, nylon powder, or polyethylene powder, may, for example, be used.

Further, these pigments which have been post-treated with various oxidizing agents or surface treating agents, may also be used.

In general, when particle size of a pigment is not more than 100 $\mu$m, dusting will be a serious problem. In the present invention, the particle size of the pigment is not particularly limited, but the present invention is particularly effective for such a pigment having a particle size of not more than 100 $\mu$m, has a particle size whereby improvement of working environment by the present invention is remarkable.

In the present invention, a press-molded product obtained by press-molding such a pigment, may also be used as the case requires. By packaging a molded pigment, handling of the packaged pigment will be easy, and the storage and transportation costs can be reduced. Further, depending upon the type and application of the pigment, the molded product is deaerated by press-molding, whereby wettability to a vehicle will be improved, and it will be readily dispersed. As a mold to be used for press-molding, mold made of any material may be employed so long as it has adequate strength durable against the pressure exerted at the time of molding. Specifically, a mold made of metal, ceramics or resin may, for example, be used.

The size of the mold is not particularly limited. Practically, however, it is preferred to mold the pigment to have a size of at least 1 cc, preferably at least 100 cc, followed by packaging. If the size is too small, handling tends to be inconvenient.

The pressing machine which can be used for pressing, may be any press-molding machine so long as press-molding can be done, such as a hydraulic mechanical pressure machine, a hydraulic hand pressing machine, a mechanical pressing machine or an air cylinder type pressing machine.

The shape of the mold is not particularly limited, and depending upon the desired shape of the molded product, it may be a columnar shape having a triangle or other polygonal cross-section, particularly a cubic or rectangular parallelepiped shape, which is advantageous from the viewpoint of handling of the mold, efficiency for packaging the resulting molded product of pigment and the handling efficiency of the packaged pigment.

The pressure applied for press-molding is preferably from 2 to 500 kgf/cm$^2$, more preferably from 5 to 400 kgf/cm$^2$. Further, after packaging such a molded product by a polyethylene film, a supersonic wave or vibration may, for example, be applied to impart cracks to the molded product in the film, whereby the dispersibility of the pigment will be further improved.

The method for packaging the pigment of the present invention is not particularly limited. As described in the foregoing, the pigment may preliminarily be molded to have a certain shape by such a means as pressing, and the molded product is intimately packaged by shrink packaging, vacuum packaging or the like. This is simple and an excellent mode whereby the resulting packaged pigment is easy for handling. Of course, a method other than this may be employed, such as a method wherein a packaging bag is prepared by the above-mentioned polyethylene, and the pigment is packed in the bag.

Further, together with the pigment, various additives, particularly powdery additives which have a problem of dusting and pollution, may be packaged. The packaging form in the present invention is not particularly limited, so long as it is capable of separating the pigment from the exterior to a desired degree and capable of preventing dusting and pollution.

The above-described polyethylene film having a density of at most 0.900 g/cc is soluble in various solvents for inks or coating materials and can be used without any problem. Accordingly, by mixing the packaged pigment of the present invention with a solvent or with a solvent and a resin component, various ink compositions or coating material compositions can be prepared.

EVA

When the carbon black aggregate of the present invention is used for an ink, the following is preferred as the covering. Namely, the aggregate is packaged by an ink-soluble material containing at least an ethylene/vinyl acetate copolymer (hereinafter referred to as "EVA").

As EVA, the vinyl acetate content is preferably from 5 to 25 wt %, more preferably from 10 to 20 wt %. If the content of vinyl acetate is less than 5 wt %, EVA tends to hardly dissolve in an ink, such being not practical. On the other hand, if the content of vinyl acetate exceeds 25 wt %, the film tends to hardly be processable, and the film tends to undergo blocking, whereby application to packaging of the base material for an ink tends to be difficult.

The content of EVA in the ink-soluble material is not particularly limited, but it is preferably at least 60 wt %, particularly preferably at least 70 wt %. Within this range, the balance between the miscibility with the solvent at the time of preparation of an ink composition and the properties as a covering material, is best.

An ink-soluble material other than EVA is a substance which can be present in an ink composition without any problem and a substance miscible with or soluble in a vehicle of an ink. Specifically, a rosin resin such as gum rosin, wood rosin or tall oil rosin, a phenol resin such as a 100% phenol resin or a modified phenol resin, a modified alkyd resin such as a fatty acid-modified alkyd resin, a rosin-modified alkyd resin, a linseed oil-modified alkyd resin, a dehydrated castor oil-modified alkyd resin or a soybean oil-modified alkyd resin, a petroleum resin, a rosin-maleic acid resin, a cyclized rubber, casein, shellac, a rosin-modified maleic acid resin, nitrocellulose, a polyamide resin, a chlorinated polypropylene, a urethane resin, an epoxy resin, an acrylic resin, a vinyl chloride resin, a vinyl chloride-vinyl acetate copolymer, a butyral resin, a vinylidene chloride resin, or a polyolefin such as a low molecular weight polyethylene, a low density polyethylene, a high density polyethylene a low molecular weight polyethylene homopolymer, a low molecular weight polyethylene/acrylic acid copolymer, a low molecular weight polyethylene/vinyl acetate copolymer or a low molecular weight polypropylene, may, for example, be mentioned.

To the soluble material, various suitable additives may be incorporated, as the case requires. For example, as a blocking-preventive agent to prevent blocking of the film itself, less than 5 wt % of an inorganic filler such as silica or talc may be added. Otherwise, less than 1 wt % of a slip agent, less than 0.5 wt % of an antioxidant or less than 0.1 wt % of a neutralizing agent, may be added. Further, less than 40 wt % of an ink-soluble polymer such as ethylcellulose, may be added as the case requires.

As additives, additives such as a dispersant, an antioxidant, an anti-drying agent, a viscosity-controlling agent, a color-adjusting agent, a reactant, a wetting agent, a defoaming agent, an anti-fungus agent, an anti-skinning agent, a buckling agent, a color breakup preventing agent and an anti-offset agent such as starch, may, for example, be mentioned. The type and the amount of the additive to be used, may be suitably selected for use depending upon the particular application of the packaged product, such as an ink, a coating material, a colored resin or a rubber. The form of such a pigment or an additive may be powdery, a dry tumbled granulated product, a wet granulated product, a compressed product by e.g. a roll compactor, or a press-molded product. Especially, a molded product press-molded by a suitable molding pressure or deaeration, is suitable for use in the present invention, since it is less in dusting or environmental pollution as compared with a powdered product, and has a high bulk density and good dispersibility.

As a solid vehicle, gilsonite, polyethylene tetrafluoride ("Teflon", tradename), wax or polyethylene wax may be mentioned. The respective components such as a pigment, an additive and a vehicle, may be coated all at once or may be coated separately. Of course, a part of them may be coated as the case requires.

The carbon black aggregate of the present invention as described above, can be suitably used for any application where carbon black can be used.

Preparation of a rubber composition

The carbon black aggregate of the present invention as described above, may be added to a rubber component, followed by mixing and dispersing to obtain a carbon black-containing rubber composition. Here, the mixing and dispersing method is not particularly limited, and a conventional method may be employed. The carbon black aggregate of the present invention may be used in the size as withdrawn from the mold used for molding, or the one disintegrated to a diameter of from 0.1 mm to 1 cm so that the size will be less than the size of the inlet of the kneading machine, may be introduced to the kneading machine. Even when a disintegrated product is used, it is possible to attain improvement of the dispersibility and a low hysteresis loss effect. Here, the disintegrating method is not particularly limited. For example, a shear pulverization type pulverizer such as a cutting mill, a rotary crusher or a shear roll mill, may be used, whereby the density of the particles during pulverization will not be increased, such being desirable.

By properly selecting the covering material, the carbon black aggregate of the present invention can be dispersed in a vehicle without removing the covering, whereby as mentioned above, the working environment can be improved, and the working efficiency can be substantially improved. However, it is of course possible to use the aggregate by removing the covering. In such a case, the scope for selection of the covering material will be broadened, although the number of working steps may increase.

The rubber component to be used in the present invention is not particularly limited. It may be at least one member of natural rubbers and synthetic rubbers. Such a rubber component is added to the above-described press-molded carbon black, followed by mixing and dispersing to obtain a rubber composition. Here, the amount of carbon black incorporated is preferably from 30 to 150 parts by weight per 100 parts by weight of the rubber, whereby a rubber having a small loss coefficient or a small amount of heat generation, can be obtained.

The rubber to be used here is not particularly limited. For example, a synthetic rubber such as styrene butadiene rubber (SBR), butadiene rubber (BR), isoprene rubber (IR), chloroprene rubber (CR), nitrilebutadiene rubber (NBR), isobutylene isoprene rubber (IIR), ethylenepropylene rubber (EPM), silicone rubber, fluorine rubber, chlorosulforinated polyethylene (CSM), chlorinated polyethylene (CM), polysulfide rubber, urethane rubber (AU), acryl rubber (ACM), epichlorohydrin rubber (ECO), propyleneoxide rubber (PO), ethylene-vinyl acetate copolymer (EVA), liquid rubber, polyalkylene sulfide or nitroso rubber, a natural rubber, or a mixture of the above rubbers, may be mentioned. Further, a vulcanizing agent, a cross-linking agent, a vulcanization-accelerating agent, a vulcanization accelerating assistant, an active agent, a dispersing agent, a vulcanization retarder, an aging-preventing agent, a reinforcing agent or a filler other than carbon black, a softening agent, a plasticizer, an adhesion-imparting agent, a colorant, a curing agent, a blowing agent, a lubricant, a solvent, a surfactant, an emulsifier, a stabilizer, a wetting agent, a thickener, a coagulant, a gelling agent, a creaming agent, an antiseptic agent, or a defoaming agent, may, for example, be incorporated, as the case requires.

The carbon black aggregate of the present invention is added to the above-described rubber component, followed by kneading to obtain a rubber composition. The kneading machine to be used here, may be a conventional machine commonly used as a kneading machine for rubber. For example, as a batch system open type, a roll mixer may be mentioned, and as a batch system closed type, a Banbury type mixer may be mentioned. As a continuous screw type, a single screw extruder or a twin screw extruder may be mentioned, and as a continuous rotor type, a single screw kneader may be mentioned. As a continuous rotor type, a twin screw kneader may be mentioned.

Preparation of an ink composition

The carbon black aggregate of the present invention, as described above, can be used for preparation of an ink, whereby an ink excellent in blackness and gloss can be obtained.

In such a case, a conventional method can be employed except that the carbon black aggregate of the present invention is used as a pigment for an ink.

Specifically, a conventional method may be employed for blending the above-described carbon black aggregate in a varnish as a vehicle. Further, the dispersing step is not particularly limited, and a conventional method may be employed, except that the carbon black aggregate of the present invention is used.

The varnish (vehicle) to be used is not particularly limited, so long as it is useful for an ink. For example, as a varnish to be used for printing, a mixture of a rosin-modified phenol resin, an alkyd resin and drying oil, which is used for lithographic printing, may be mentioned. As a varnish to be used for relief printing, a mixture comprising a natural resin such as gilsonite or rosin, a synthetic resin such as a rosin-modified phenol resin, a maleic acid resin, a petroleum resin, an alkyd resin or ester gum, a vegetable oil such as linseed oil or tung oil, and a mineral oil such as an ink oil or a solvent oil, may be mentioned. As a varnish to be used for a rotary press ink, a mixture comprising a resin such as gilsonite, a rosin-modified phenol resin, a rosin ester resin, a maleic acid resin or an alkyd resin, a drying oil such as linseed oil or tung oil and a mineral oil such as ink oil, ink solvent, spindle oil or machine oil, may be mentioned. As a varnish to be used for a gravure ink, a mixture comprising a resin such as a rosin-modified resin, a maleic acid resin or gilsonite, and a solvent such as toluene, n-hexane or cyclohexane, may be mentioned. As a varnish to be used for an aqueous gravure ink, a mixture comprising a resin such as a polyvinyl alcohol or starch and various alcohols, may be mentioned. As a varnish to be used for a flexo ink, a mixture comprising a resin such as a rosin-modified maleic acid resin, a styrene acrylic acid resin, a styrene maleic acid resin, a styrene methacrylic resin, an acrylate acrylic acid resin or a methacrylate acrylic acid resin, and a solvent such as glycol, an alcohol, an ester or an aliphatic hydrocarbon, may be mentioned. Further, as a varnish to be used for a screen ink, a mixture comprising a resin such as an acrylic resin, a vinyl chloride-vinyl acetate copolymer, a polyester resin, a cellulose resin, an epoxy resin, a melanine resin, various polyols, an alkyd resin or various acrylates, and a solvent such as various alcohols, various ethers, various ketones, various aromatic hydrocarbons, various aliphatic hydrocarbons or various halogen type solvents, a solvent comprising a paraffin hydrocarbon as the main component, a solvent comprising a naphthene hydrocarbon as the main component, or a solvent comprising a mineral oil as the main component, may be mentioned.

The ink for which the present invention may be used, is not particularly limited, and may, for example, be an oil based ink, a resin type ink, a linseed ink, a wax ink, a pigment ink, a relief printing ink such as news ink, rotary press ink or half tone block ink, a lithographic printing ink such as offset ink, dry offset ink or colo type ink, an intaglio printing ink such as engraved intaglio ink, gravure ink, quick set ink, gloss ink, abrasion resistant ink, heat set ink, steam set ink, pressure set ink, plastisol ink, balanced ink, cold set ink or raset ink, or others such as a rubber plate ink, an aniline ink, a tin plate printing ink, an ink for plastic film, a silk screen ink, a water based ink, an Indian ink such as Chinese ink or black writing fluid, or a pigment ink for preparation of colored paper. The pigment for an ink of the present invention can be used for the production of any one of these inks.

A method for dispersing the carbon black aggregate of the present invention in a vehicle, is not particularly limited. It may be used in a size as taken out from the mold used for molding. Otherwise, it may be crushed to a diameter of from 0.1 mm to 1 cm so that the size will be smaller than the inlet of a kneader, and then put into the kneader for dispersing. The effect for improving blackness can be obtained even when the crushed product is used.

Here, the crushing method is not particularly limited, but it is preferred to use a shearing type crusher such as a cutting mill, a rotary crusher or a shearing roll mill, whereby the density of the particles will not be increased during crushing.

Further, the pigment for an ink of the present invention can be dispersed into a vehicle without removing the covering, by properly selecting the material of the covering, whereby the working environment can be improved, and the operation efficiency can substantially be improved, as mentioned above. However, the covering may, of course, be removed for use. In such a case, the scope of selection of the covering material will be broadened, although an operational step increases.

For preparation of a water based ink by means of the pigment of the present invention, a conventional method for preparation of a water-based ink can be used without any particular change to prepare an ink. For example, as a varnish useful for a water based ink, an alkali soluble resin such as a rosin maleic acid resin, a styrene acrylic acid resin, a styrene maleic acid resin, a styrene methacrylic acid resin, an acrylic acid ester acrylic acid resin or a methacrylic acid ester acrylic acid resin, a hydrosol type resin such as a styrene maleic acid resin, a styrene acrylic acid resin, an α-methylstyrene acrylic resin, an acrylic acid ester acrylic acid resin or a methacrylic acid ester acrylic acid resin, an emulsion type resin such as a styrene resin, a styrene acrylic acid ester resin, an acrylic acid ester copolymer resin or a methacrylic acid ester copolymer resin, may be used.

Further, depending upon the particular application, a dispersant, a drying retarder, an antiseptic agent, a defoaming agent or an oxygen-absorber may, for example, be added.

Such varnish, additives and pigments including carbon black may be dispersed in a particle size suitable for the particular application by means of a conventional dispersing machine such as a ball mill, a sand mill, an attriter, a basket mill or a roll mill, to obtain a water based ink.

Further, in an application where inclusion of coarse particles must be avoided as in the case of an ink for ink jet, coarse particles may be removed by such a method as centrifugal separation after the preparation of the ink.

preparation of a resin composition

The carbon black aggregate of the present invention, as described above, may be used to obtain a resin composition. Specifically, the carbon black aggregate of the present invention is mixed with a resin component. The mixture is kneaded, as the case requires. Here, as a kneader for rubber, the one commonly used as a kneader for rubber, such as a roll mixer of a batch system open type, a Banbury type mixer of a batch system closed type, a single screw kneading extruder or a twin screw kneading extruder of a continuous screw type, a single shaft kneader of a continuous rotor type, or a twin shaft kneader of a continuous rotor type, may be used. In the preparation of the resin composition, a master batch may preliminarily be prepared, or the resin composition may be directly prepared by blending.

The method for dispersing the carbon black aggregate of the present invention in the resin component is not particularly limited. It may be used in a size as taken out from the mold used for molding. Otherwise, it may be crushed to a diameter of from 0.1 mm to 1 cm so that the size will be smaller than the inlet of a kneader, and then put into the kneader for dispersing. The effect for improving blackness and gloss can be obtained even when the crushed product is used. Here, the crushing method is not particularly limited, but it is preferred to use a shearing type crusher such as a cutting mill, a rotary crusher or a shearing roll mill, whereby the density of the particles will not be increased during crushing.

Further, the carbon black aggregate of the present invention can be dispersed in the vehicle without removing the covering, by properly selecting the material of the covering, whereby the working environment can be improved, and the operation efficiency can be substantially improved, as mentioned above. However, the covering may, of course, be removed for use. In such a case, the scope for selection of the covering material will be broadened, although an operational step increases.

Further, in addition to the above carbon black aggregate and the resin component, calcium stearate, an iron stabilizer, an antioxidant and other additives may be optionally added as the case requires.

The blending proportions of these components are preferably such that, in the case of preparing a master batch, carbon black as the pigment is from 30 to 60 wt %, the additives are a few wt %, and the rest is the resin component. The master batch thus prepared may be added to a molten resin to bring the carbon black concentration to a few wt %. On the other hand, in a case where a resin composition is prepared by direct blending, it is preferred that the carbon black is from 0.1 to 5 wt %, the additives are a few wt %, and the rest is the resin component.

As described above, the carbon black aggregate of the present invention is used for preparation of a resin composition. The resin composition to which the present invention is applicable is not particularly limited, and the present invention can be applied to a conventional resin composition. For example, a colored resin, an electrophotographic tonor, a spinning material for artificial fibers or a sealing agent may, for example, be mentioned.

Here, "a colored resin" means a resin having carbon black added thereto to have a color other than the color of the resin itself imparted. The purpose may, for example, be to impart to the resin (1) a decorative effect for the purpose of improving a commercial value, (2) a protective effect against ultraviolet rays utilizing the ultraviolet ray-absorbing function of the pigment, (3) an antistatic effect utilizing the electrical conductivity or (4) a reinforcing effect.

"The electrophotographic tonor" is a colorant which is used for a copying machine, a printer or a facsimile wherein an image is formed by electrophotography. The tonor comprises a thermoplastic binder resin, a colorant (carbon black) and a charge-controlling agent, and it is common to employ carbon black having an agglomerated particle size of from 5 to 20 $\mu$m. The binder resin constitutes about 80 wt % of the tonor component, and it is common to employ a polyethylene resin, a methacrylic acid resin or a copolymer thereof, a polyester or an epoxy type resin. Carbon black is usually added in an amount of about 10 wt %.

"The spinning material for artificial fibers" means a spinning material to be used for coloring a stock solution in a method wherein a colorant is added to a spinning stock solution for artificial fibers (chemical fibers, synthetic fibers), and such a stock solution is subjected to spinning to obtain colored fibers. As the fibers, viscose rayon, acetate, acrylic fibers, nylon, polyester or polypropylene may, for example, be usually employed. Spinning is usually carried out by three methods i.e. melt spinning, wet spinning and dry spinning. The colorant is used in four forms i.e. a master powder, a paste, a master batch and a color pellet. Recently, for the purpose of reducing pollution by carbon black, a master batch tends to be used in many cases. With respect to the type of carbon black, carbon black of common use to medium class is used in many cases. The colored fibers may be used, for example, for working clothes, school uniforms, swimming suits, sport wears, cloth for umbrellas, socks, carpets, canvases and fishing nets.

"The sealing agent" is one used for sealing of e.g. a window glass of an automobile or as an adhesive for steel plates.

The above-described resin compositions are merely examples of the resin compositions to which the present invention can be applied. The resin compositions to which the present invention can be applied, are not limited to such examples but extend to cover a wide range.

Preparation of a coating composition

The above-described carbon black aggregate may be used as a pigment to prepare a coating composition. For the preparation of the coating material, a conventional method may be employed except that the above carbon black aggregate is used as the pigment. Specifically, the carbon black aggregate of the present invention is mixed with a varnish and a resin component.

The varnish (the vehicle) to be used here is not particularly limited so long as it is useful for a coating material. For example, it may be drying oil, improved drying oil, a natural resin or bitumen for an oil based coating material. It may be shellac for an alcoholic coating material. It may be nitrocellulose, acetyl cellulose, an acrylic resin, a phenol formaldehyde resin or a resin modified phenol formaldehyde resin for a cellulose derivative coating material. It may be an oxidized oil-modified alkyd resin, a modified alkyd resin, a butyrated aminoalkyd resin, an aminoalkyd resin, polyvinyl acetate, polyvinyl chloride, chlorinated rubber, a styrene-butadiene resin, a thermosetting acrylic resin, an epoxy resin, an unsaturated polyester, a polyisocyanate resin, silicone and an alkyd resin, or butyl titanate for a synthetic resin coating material. It may be polyvinyl acetate, polystyrene-butadiene or a polyacrylic compound for a synthetic emulsion paint. It may be a phenol aldehyde polycondensate, an etherified melamine resin or an amine-neutralized alkyd resin for a water-base baking paint. It may be a protein-starch-arginate-polyvinyl alcohol or carboxymethyl cellulose for a water base coating material. Natural high grade phenol or a natural phenol aldehyde resin may be used for a Japanese lacquer.

The solvent is also not particularly limited, and a conventional solvent may be used, such as toluene, xylene, methyl ethyl ketone, methyl isobutyl ketone or water. Further, various additives may be used.

The blending proportions of these components may be conventional. Specifically, it is common that the varnish (non-volatile component) is from 20 to 40 wt %, the additives are a few wt %, and carbon black is from 0.5 to 5 wt %.

The coating material is also not particularly limited. For example, according to classification based on the main components of the coating films, it may, for example, be an oil paint, an oil enamel, a phenol resin coating material, a maleic acid resin coating material, an alkyd resin coating material, an aminoalkyd resin coating material, a urea resin coating material, an alcoholic coating material, a lacquer, a vinyl resin coating material, an acryl resin coating material, a polyester resin coating material, an epoxy resin coating material, a polyurethane resin coating material, a silicone resin coating material, an emulsion resin coating material or a water-soluble resin coating material.

The application of the coating material thus obtained is not particularly limited. For example, it can be used as a back coat for a magnetic tape. In such a case, the carbon black is required to have properties such as electrical conductivity, light-shielding property and a property for imparting surface irregularities. The carbon black may suitably be selected depending upon the required properties. As the varnish, a urethane type varnish may particularly preferably be used.

The method for dispersing the carbon black aggregate of the present invention in the varnish, is not particularly limited. It may be used in a size as taken out from the mold used for molding. Otherwise, it may be crushed to a diameter of from 0.1 mm to 1 cm so that the size will be smaller than the inlet of a kneader, and then put into the kneader for dispersing. The effect for improving blackness and gloss can be obtained even when the crushed product is used.

Here, the crushing method is not particularly limited, but it is preferred to use a shearing type crusher such as a cutting mill, a rotary crusher or a shearing roll mill, whereby the density of the particles will not be increased during crushing.

Further, the pigment for a coating material of the present invention can be dispersed in a vehicle without removing the covering, by properly selecting the material of the covering, whereby the working environment can be improved, and the operation efficiency can substantially be improved, as mentioned above. However, the covering may, of course, be removed for use. In such a case, the scope for selection of the covering material will be broadened, although an operational step increases.

The mechanism for the improvement of the property such as blackness by the carbon black aggregate of the present invention, is not clearly understood, but the following can be assumed. Namely, as a mechanism for dispersion of carbon black in a varnish, it is considered that "this is a substitution step from a solid-gas interface to a solid-liquid interface i.e. from an air-pigment interface to a pigment-dispersing medium interface, and in the resulting solid-liquid dispersion system, the interaction at the interface of the pigment and the dispersion medium and the nature of the solid surface of pigment plays the main role" ("Most Recent Pigment Application Technique", published by Kabushiki Kaisha CMC, p. 137 et seq.). Accordingly, in the pigment for a coating material of the present invention, air among carbon black particles is deaerated by press molding, and the substitution from the solid-gas interface to the solid-liquid interface is believed to be facilitated. In any case, by using the pigment for a coating material of the present invention, it is possible to accomplish extremely outstanding effects such that handling efficiency of carbon black as the pigment is improved, the environmental pollution due to dusting during handling can be prevented, and the costs for storage and transportation can be reduced, and at the same time the dispersibility, blackness and gloss of the resulting coating material can be substantially improved.

Now, the present invention will be described in further detail with reference to Examples. However, it should be understood that the present invention is by no means restricted to such specific Examples.

Application of a packaged carbon black aggregate to an ink or a coating material Examples will be given in which a carbon black aggregate having a surface hardness of at least 70 g is packaged by a film soluble in a solvent which is used for an ink or a coating material.

EXAMPLE 1

(1) Solubility test 1 in solvents

Five types of resins i.e. super low density polyethylene "EG8200" manufactured by Dow Chemical Co., Ltd. (density: 0.870 g/cc, hereinafter referred to as "PE(A)"), super low density polyethylene "Kernel" manufactured by Nippon Polychem K.K. (density: 0.880 g/cc, hereinafter referred to as "PE(B)"), ethylene-vinyl acetate copolymer "Novatec EVA, LV440" manufactured by Nippon Polychem K.K. (vinyl acetate content: 15 wt %, density: 0.940 g/cc, hereinafter referred to as "EVA"), low density polyethylene "LH100N" manufactured by Nippon Polychem K.K. (density: 0.921 g/cc, hereinafter referred to as "PE(C)"), and high density polyethylene "HB430", manufactured by Nippon Polychem K. K. (density: 0.958 g/cc, hereinafter referred to as "PE(D)"), were formed into films having a thickness of 30 µm, and 0.2 g of a sample was cut out from each film. 20 g of "No. 6 Solvent", a solvent for printing ink, manufactured by Nippon Oil Co., Ltd., was put into each of five Erlenmeyer flasks having a capacity of 100 cc, and the above-mentioned films of five types were put into the Erlenmeyer flasks, respectively. The Erlenmeyer flasks were put into a water bath, and the water temperature was set to be 40° C. Stirring was carried out for 1 hour to confirm the dissolution of films in the Erlenmeyer flasks. None of the films of five types dissolved. Then, the temperature was set to be 45° C., and stirring was carried out for 1 hour, whereby inspection was carried out in the same manner. PE(A) dissolved, and others did not dissolve. Further, similar operations were repeated to confirm the dissolution temperatures. PE(B) dissolved at 55° C., EVA dissolved at 65° C., but PE(C) and PE(D) did not dissolve even at 80° C.

The results are shown in Table 1.

TABLE 1

| | Dissolution temperatures of polyethylene films (ink) | | | | |
|---|---|---|---|---|---|
| Brand | PE(A) | PE(B) | EVA | PE(C) | PE(D) |
| Density (g/cc) | 0.870 | 0.880 | 0.940 | 0.921 | 0.958 |
| 40° C. | Insoluble | Insoluble | Insoluble | Insoluble | Insoluble |
| 45° C. | Soluble | Insoluble | Insoluble | Insoluble | Insoluble |
| 50° C. | | Insoluble | Insoluble | Insoluble | Insoluble |
| 55° C. | | Soluble | Insoluble | Insoluble | Insoluble |
| 60° C. | | | Insoluble | Insoluble | Insoluble |
| 65° C. | | | Soluble | Insoluble | Insoluble |
| 70° C. | | | | Insoluble | Insoluble |
| 75° C. | | | | Insoluble | Insoluble |
| 80° C. | | | | Insoluble | Insoluble |

(2) Solubility test 2 in solvents

The same operation as the above operation (1) was carried out except that instead of EVA, PS film "Styrofan" manufactured by Oishi Sangyo K. K. (density: 1.050 g/cc, thickness: 31 µm) was subjected to the test, and instead of No. 6 Solvent, "Thinner No. 3 for Baking Coating Material" manufactured by Kansai Paint K. K., which is a solvent for a coating material, was used. PE(A) and PS dissolved at 40° C., and PE(B) dissolved at 50° C. However, PE(C) and PE(D) did not dissolve even when the temperature was raised to 70° C. The results are shown in Table 2.

TABLE 2

| | Dissolution temperatures of polyethylene films (coating material) | | | | |
|---|---|---|---|---|---|
| Brand | PE(A) | PE(B) | PS | PE(C) | PE(D) |
| Density (g/cc) | 0.870 | 0.880 | 1.050 | 0.921 | 0.958 |
| 40° C. | Soluble | Insoluble | Soluble | Insoluble | Insoluble |
| 45° C. | | Insoluble | | Insoluble | Insoluble |
| 50° C. | | Soluble | | Insoluble | Insoluble |
| 55° C. | | | | Insoluble | Insoluble |
| 60° C. | | | | Insoluble | Insoluble |
| 65° C. | | | | Insoluble | Insoluble |
| 70° C. | | | | Insoluble | Insoluble |

(3) Preparation of a test specimen

Into a carbon steel mold (inner dimensions 150 mm×150 mm, height: 360 mm), 1 kg of carbon black "MA7" manufactured by Mitsubishi Chemical Corporation (particle size: 24 nm, DBP oil absorption: 65 cc/100 g carbon black, bulk density: 0.190 g/cc) was introduced and set in a hydraulic pressing machine manufactured by Yuken K. K. The carbon black was pressed to a pressure of 2 kgf/cm$^2$ in 1 minute for aggregation to obtain a carbon black aggregate having a predetermined shape. The density of the aggregate (the value obtained by dividing the mass by the volume) was 0.565 g/cm$^3$. The obtained carbon black aggregate was cut into two equal specimens along the pressing axis of the aggregate by means of an electrical fret saw. One specimen was used for measurement of the hardness, and the other specimen was used for measuring the powdering ratio and the initial dispersibility and for preparation of an ink.

(4) Measurement of hardness

The hardnesses of the surface and the cut face (interior) of one of the equally divided specimens of the aggregate, were measured. As the hardness meter, a spring type hardness meter (HD-103N Model) manufactured by Kabushiki Kaisha Kamishima Seisakusho, was used. The top surface and the side surface of the aggregate were measured three times each, and the mean value of the six points was taken as the surface hardness. As a result, the surface hardness was 90 g. The hardness of the cut face (interior) was measured three times, and the mean value was taken as the interior hardness. The interior hardness was 61 g.

(5) Measurement of the powdering ratio

The powdering ratio was measured by the following method.

The carbon black aggregate was accurately weighed for 25±0.01 g (W), and put into a sieve having a diameter of 200 mm with an opening of 1 mm, as stipulated in JIS K-6221. A receptacle and a cover were attached to this sieve, and the sieve was shaked by a shaking machine as stipulated in JIS K-6221 for 20 seconds while applying shocks. The receptacle was detached from the shaking machine, and the weight of carbon black in the receptacle was accurately weighed to an accuracy of 0.01 g, and this was taken as the weight (WR) after shaking, whereupon the powdering ratio was calculated by the following formula.

Powdering ratio (%)=(W$_R$/W)×100

W$_R$=5.30 g, and the powdering ratio was 21.2%. Slight powdering occurred, but it was in a no problematic quantity.

(6) Measurement of the initial dispersibility of ink

A method for measuring the ink screen residue as an index for the dispersibility of carbon black in the preparation of an ink, will be described below.

Into an about 1.8 l stainless steel container (diameter: 11 cm, height: 18.5 cm), 480 g of REDUCTUS #220 (manufactured by Kyodo Sekiyu) and 120 g of the carbon black aggregate, were added. A stirrer (four vanes, diameter of each vane: 4.5 cm) set in TK AUTO HOMOMIXER SL10A (manufactured by Tokushu Rika Kogyo) was inserted at 2 cm above the bottom of the stainless steel container. The stirrer was operated at 5000 rpm and stirring was carried out for 1 hour. 50 g of the mixture was sampled and subjected to filtration with a stainless steel screen of 325 mesh (opening: 46 $\mu$m). After the filtration, about 200 cc of light oil was sprinkled on the screen for washing. This screen was dried for 1 hour in a dryer set at 150° C. Then, the screen was taken out from the dryer and cooled, and then the weight of the screen was measured. The weight of the initial screen preliminarily measured, was subtracted from the measured value to obtain the weight (A g) of the carbon black remaining on the screen, whereupon the screen residue was calculated by the following formula.

Ink screen residue (%)=(A×600/(50×120))×100

The ink screen residue was 0.3 wt %, thus indicating good dispersibility.

(7) Preparation of a heat shrink package 114 g of a carbon black aggregate was cut out from the above-mentioned carbon black aggregate and wrapped by a PE(B) film having a thickness of 30 $\mu$m formed by inflation molding, followed by heat-sealing at 180° C. for 2 seconds. This carbon black aggregate enclosed in the film was introduced into a shrink tunnel (Model: "NS-450") manufactured by Nissan Kiko K. K. set at 150° C., and the carbon black aggregate was subjected to shrink packaging. The packaged carbon black aggregate was touched with a hand, whereby the hand was not stained.

(8) Preparation of an ink 380 g of varnish "MS-800" manufactured by Showa Varnish K. K., 20 g of varnish "F104" manufactured by Showa Varnish K. K. and 57 g of "No. 6 Solvent" manufactured by Nippon Sekiyu K. K. were weighed and put into a vessel (diameter: 11 cm, height: 18.5 cm). This varnish was stirred for 1 hour at 5000 rpm by a homomixer (Model: "TK AUTO HOMOMIXER SL-10A") manufactured by Tokushu Rika Kogyo K. K. to obtain a varnish for commercial offset ink. The vessel was heated to bring the temperature of the varnish to 80° C. 114 g of the above shrink-packaged carbon black aggregate was added to the varnish for commercial offset ink prepared as described above, followed by stirring at 5000 rpm for 120 minutes to obtain an ink.

At that time, no dusting of carbon black occurred.

(9) Kneading

The ink thus obtained was kneaded by a roll mill (Model: "BR-500") manufactured by Asada Tekkosho K. K., whereupon the size of non-dispersed blocks as measured by a grined gauge was confirmed to be not larger than 10 $\mu$m. It was necessary to pass the ink through the roll mill four times until the size of the non-dispersed blocks became not larger than 10 $\mu$m. This ink was aged for one week and then used as an ink for testing.

(10) Drawdown test 0.6 cc of this aged ink was sampled and set in an offset printing machine manufactured by Toyo Seiki K. K. Sheets of groundwood paper of A4 size were fed to this printing machine and printed. The ink was naturally dried, and then the printed surface was subjected to color difference measurement by a SM color computer manufactured by Suga Shikenki K. K. to determine the L value. As a result, the L value (lightness) was 27.6. The L value was equal to the ink (Comparative Example 7) prepared by using powdery carbon black "MA7" which was not molded or packaged.

The L value (lightness) of the ink was in accordance with the Hunter's color difference described in JIS Z-8730-1980 (color difference representation method).

EXAMPLE 2

The same operation as in Example 1 was carried out except that the molding pressure was changed to 22.2 kgf/cm$^2$. The density of the molded product was 0.598 g/cc, the surface hardness was 622 g, and the interior hardness was 497 g.

Further, the powdering ratio and the screen residue were determined in the same manner as in Example 1. The powdering ratio was 1.2 wt %, and the screen residue was 12.3 wt %. Thus, both values were good.

This carbon black aggregate was packaged in the same manner as in Example 1, and an ink was prepared. During the preparation of the ink, no dusting was observed. The ink was passed through the roll mill three times. Further, as a result of the drawdown test, the L value was 27.5. This value was equal to Comparative Example 7.

EXAMPLE 3

The same operation as in Example 1 was carried out except that the molding pressure was changed to 44.4 kgf/cm$^2$. The density of the molded product was 0.656 g/cc, the surface hardness was 686 g, and the interior hardness was 617 g.

Further, the powdering ratio and the screen residue were determined in the same manner as in Example 1. The powdering ratio was 0.4 wt %, and the screen residue was 20.6 wt %. Thus, both values were good.

This carbon black aggregate was packaged in the same manner as in Example 1, and an ink was prepared. During the preparation of the ink, no dusting was observed. The ink was passed through the roll mill twice. Further, as a result of the drawdown test, the L value was 27.3. This L value was equal to Comparative Example 7.

EXAMPLE 4

Into a SUS304 mold (inner size: 70 mm×70 mm, height: 70 mm), 0.1 kg of carbon black "MA7" manufactured by Mitsubishi Chemical Corporation was put and set in a hydraulic press machine manufactured by Yuken K. K. The carbon black was pressed to a pressure of 408.2 kgf/cm$^2$ in 1 minute to have the carbon black aggregated to obtain a carbon black aggregate having a predetermined shape. The density of the aggregate (the value obtained by dividing the mass by the volume) was 0.844 g/cm$^2$.

Further, the hardness, the powdering ratio and the screen residue were determined in the same manner as in Example 1. The surface hardness was 1,270 g, the interior hardness was 1,219 g, the powdering ratio was 0.2 wt %, and the screen residue was 51.2 wt %. Thus, the powdering ratio was good at a low level. The hardness and the screen residue were slightly high, but at no problematic levels.

This carbon black aggregate was packaged in the same manner as in Example 1, and an ink was prepared. During the preparation of the ink, no dusting was observed. The ink was passed through the roll mill three times. Further, as a result of the drawdown test, the L value was 27.2. This L value was equal to Comparative Example 7.

EXAMPLE 5

To 100 parts by weight of EVA manufactured by Nippon Polychem K. K., 0.30 part by weight of fatty acid amide, 0.90 part by weight of silica and 0.075 part by weight of calcium hydroxide were added, followed by inflation molding to obtain a film (thickness: 30 μm).

A carbon black aggregate was prepared in the same manner as in Example 1 except that the molding pressure was changed to 7.4 kgf/cm. The density of the molded product was 0.566 g/cc.

The hardness, the powdering ratio and the screen residue were determined in the same manner as in Example 1. The surface hardness was 121 g, the interior hardness was 85 g, the powdering ratio was 16.5 wt %, and the screen residue was 2.2 wt %. Both the powdering ratio and the screen residue were good.

114 g was cut from the carbon black aggregate prepared in Example 2 and packaged by the above film.

Using this packaged carbon black aggregate, an ink was prepared in the same manner as in Example 1. During the preparation of the ink, no dusting was observed. The ink was passed through the roll mill three times. Further, as a result of the drawdown test, the L value was 27.5. This L value was equal to Comparative Example 7. Further, during the preparation of the packaged carbon black aggregate itself or the ink employing it, no dusting or environmental pollution was observed.

EXAMPLE 6

0.30 part by weight of fatty acid amide, 0.90 part by weight of silica and 0.075 part by weight of calcium hydroxide were added to 100 parts by weight of a resin composition having 40 wt % of ethyl cellulose "N-50" manufactured by Hercules Co., Ltd. blended to 60 wt % of EVA, followed by inflation molding to obtain a film (thickness; 30 μm).

An ink was prepared in the same manner as in Example 2 except that this film was used for packaging the carbon black aggregate.

As a result of the drawdown test, the L value was 27.5. This L value was equal to Comparative Example 7. Further, during the preparation of the packaged carbon black aggregate itself or the ink employing it, no dusting or environmental pollution was observed.

EXAMPLE 7

A packaged carbon black aggregate was prepared in the same manner as in Example 2 except that a PE(A) film was used instead of the PE(B) film for packaging, and using this carbon black aggregate, an ink was prepared.

As a result of the drawdown test, the L value was 27.5. This L value was equal to Comparative Example 7. Further, during the preparation of the packaged carbon black aggregate itself or the ink employing it, no dusting or environmental pollution was observed.

EXAMPLE 8

An ink was prepared in the same manner as in Example 1 except that instead of carbon black MA7, carbon black "#45" (particle size: 24 nm, DBP oil absorption: 53 cc/100 g carbon black, bulk density: 0.270 g/cc) manufactured by Mitsubishi Chemical Corporation, was used. The density of the molded product was 0.565 g/cc.

The surface hardness of the carbon black aggregate was 78 g, the interior hardness was 63 g, the powdering ratio was 24.5 wt %, and the screen residue was 15.2 wt %. The powdering ratio was slightly high but within a no problematic range.

To examine dusting during preparation of an ink, an ink was prepared in the same manner as in Example 1 using the carbon black (#45) aggregate packaged by PE(B). During the preparation of the packaged carbon black aggregate itself or the ink employing it, no dusting or environmental pollution was observed.

EXAMPLE 9

An ink was prepared in the same manner as in Example 2 except that the carbon black was changed from MA7 to carbon black "#45" manufactured by Mitsubishi Chemical Corporation. The density of the molded product was 0.692 g/cc.

The surface hardness of the carbon black aggregate was 623 g, the interior hardness was 437 g, the powdering ratio was 1.2 wt %, and the screen residue was 18.1 wt %. Both the powdering ratio and the screen residue were good.

To examine dusting during preparation of an ink, an ink was prepared in the same manner as in Example 1 using the carbon black (#45) aggregate packaged by PE(B). During the preparation of the packaged carbon black aggregate itself or the ink employing it, no dusting or environmental pollution was observed.

EXAMPLE 10

An ink was prepared in the same manner as in Example 3 except that the carbon black was changed from MA7 to carbon black "#45" manufactured by Mitsubishi Chemical Corporation. The density of the molded product was 0.771 g/cc.

The surface hardness of the carbon black aggregate was 708 g, the interior hardness was 552 g, the powdering ratio was 0.3 wt %, and the screen residue was 30.4 wt %. Both the powdering ratio and the screen residue were good.

To examine dusting during preparation of an ink, an ink was prepared in the same manner as in Example 1 using the carbon black (#45) aggregate packaged by PE(B). During the preparation of the packaged carbon black aggregate itself or the ink employing it, no dusting or environmental pollution was observed.

EXAMPLE 11

An ink was prepared in the same manner as in Example 2 except that the carbon black was changed from MA7 to carbon black "#45" manufactured by Mitsubishi Chemical Corporation. The density of the molded product was 1.024 g/cc.

The surface hardness of the carbon black aggregate was 1,280 g, the interior hardness was 1,211 g, the powdering ratio was 0.1 wt %, and the screen residue was 88.9 wt %. The screen residue was slightly high, but within a no problematic range.

To examine dusting during preparation of an ink, an ink was prepared in the same manner as in Example 1 using the carbon black (#45) aggregate packaged by PE(B). During the preparation of the packaged carbon black aggregate itself or the ink employing it, no dusting or environmental pollution was observed.

EXAMPLE 12

An ink was prepared in the same manner as in Example 9, except that a PE(A) film was used instead of the PE(B) film for packaging. The hardness, the powdering ratio and the screen residue were determined in the same manner as in Example 1.

To examine dusting during preparation of an ink, an ink was prepared in the same manner as in Example 1 using the carbon black (#45) aggregate packaged by PE(A). During the preparation of the packaged carbon black aggregate itself or the ink employing it, no dusting or environmental pollution was observed.

EXAMPLE 13

An ink was prepared in the same manner as in Example 1, except that the carbon black was changed from MA7 to carbon black "#990" (particle size: 16 nm, DBP oil absorption: 113 cc/100 g carbon black, bulk density: 0.081 g/cc) manufactured by Mitsubishi Chemical Corporation. The density of the molded product was 0.241 g/cc.

The surface hardness of the carbon black aggregate was 78 g, the interior hardness was 60 g, the powdering ratio was 24.5 wt %, and the screen residue was 15.2 wt %. The powdering ratio was slightly high, but within a no problematic range.

To examine dusting during preparation of an ink, an ink was prepared in the same manner as in Example 1 using the carbon black (#990) aggregate packaged by PE(B). During the preparation of the packaged carbon black aggregate itself or the ink employing it, no dusting or environmental pollution was observed.

EXAMPLE 14

An ink was prepared in the same manner as in Example 2, except that the carbon black was changed from MA7 to carbon black "#990" manufactured by Mitsubishi Chemical Corporation. The density of the molded product was 0.430 g/cc.

The surface hardness of the carbon black aggregate was 592 g, the interior hardness was 437 g, the powdering ratio was 1.1%, and the screen residue was 18.1%. Both the powdering ratio and the screen residue were good.

To examine dusting during preparation of an ink, an ink was prepared in the same manner as in Example 1 using the carbon black (#990) aggregate pac kaged by PE(B). During the preparation of the packaged carbon black aggregate itself or the ink employing it, no dusting or environmental pollution was observed.

EXAMPLE 15

An ink was prepared in the same manner as in Example 3, except that the carbon black was changed from MA7 to carbon black "#990" manufactured by Mitsubishi Chemical Corporation. The density of the molded product was 0.485 g/cc.

The surface hardness of the carbon black aggregate was 673 g, the interior hardness was 552 g, the powdering ratio was 0.2 wt %, and the screen residue was 30.4 wt %. Both the powdering ratio and the screen residue were good.

To examine dusting during preparation of an ink, an ink was prepared in the same manner as in Example 1 using the carbon black (#990) aggregate packaged by PE(B). During the preparation of the packaged carbon black aggregate itself or the ink employing it, no dusting or environmental pollution was observed.

EXAMPLE 16

An ink was prepared in the same manner as in Example 4, except that the carbon black was changed from MA7 to carbon black "#990" manufactured by Mitsubishi Chemical Corporation. The density of the molded product was 0.662 g/cc.

The surface hardness of the carbon black aggregate was 1,350 g, the interior hardness was 1,270 g, the powdering ratio was 0.1 wt %, and the screen residue was 76.3 wt %. The screen residue was slightly high, but within a no problematic range.

To examine dusting during preparation of an ink, an ink was prepared in the same manner as in Example 1 using the carbon black (#990) aggregate packaged by PE(B). During the preparation of the packaged carbon black aggregate itself or the ink employing it, no dusting or environmental pollution was observed.

EXAMPLE 17

(1) Preparation of a carbon black aggregate 0.5 kg of carbon black "#2650" (particle size: 13 nm, DBP oil absorption: 78 cc/100 g carbon black, bulk density: 0.077 g/cc) manufactured by Mitsubishi Chemical Corporation, was put into a carbon steel mold (inner size: 150 mm×150 mm, height: 360 mm) manufactured by Yuken K. K., and set in a hydraulic press manufactured by Yuken K. K. Press molding was carried out by applying a pressure of 22.2 kgf/cm$^2$ to obtain a carbon black aggregate. The density of the obtained aggregate was measured and found to be 0.491 g/cc.

(2) Preparation of a heat shrink package

Using PE(B), a polyethylene bag of 5 cm×5 cm was prepared in the same manner as in Example 1.

3 g of a carbon black aggregate was cut out from the above carbon black aggregate and put into the above polyethylene bag, and the bag was sealed.

(3) Preparation of a coating material 90 g of glass beads having a diameter of from 2.5 to 3.5 mm, manufactured by Tokyo Glass K. K. were put into a mayonnaise bottle of 140 cc. Then, 16 g of a melamine alkyd resin varnish (Amylak 1026) manufactured by Kansai Paint K. K., 10 g of Amylak Thinner manufactured by Kansai Paint K. K. and the above carbon black aggregate were put into the mayonnaise bottle.

This mayonnaise bottle was set on a single type paint shaker "RC-5000A" manufactured by Red Devil Co. and shaked for 15 minutes. This black varnish was cooled to room temperature, and then the size of non-dispersed block carbon black within a range of from 0 to 50 μm was measured by a grind gauge (model: R1110) manufactured by Kabushiki Kaisha Kamishima Seisakusho. The result of measurement by the grind gauge was 7 μm.

Further, 50 g of "Amylak 1026 Clear" was put into this mayonnaise bottle, followed by mixing for 10 minutes by the paint shaker to obtain a black coating material.

(4) Evaluation of blackness

A part of the black coating material was sampled (about 1 cc), and put on a PET film (Trancee G. thickness: 180 μm) manufactured by Fuji Film Co., Ltd. and stretched by a bar coater (No. 24) manufactured by Toyo Seiki K. K. This PET film was subjected to baking for 20 minutes in an air circulating dryer (Automatic Drying Oven SS-200N) manufactured by Ikeda Rika K. K. set at 120° C. The L value of the black coating film thus baked was measured by a color difference meter (Spectro Color Meter SE-2000) manufactured by Nippon Denshoku K. K. The L value was 4.22. This L value was equal to a coating material which was prepared by using powdery carbon black "#2650" which was not molded or packaged.

EXAMPLE 18

A coating material was prepared in the same manner as in Example 17 except that the packaging film in Example 17 was changed from PE(B) to PS manufactured by Oishi Sangyo K. K.

The grined gauge value was 8 μm, and the L value of the coating film was 4.23. This L value was equal to a coating material which was prepared by using powdery carbon black "#2650" which was not molded or packaged.

The L value (lightness) of the coating film was in accordance with the Hunter's color difference described in JIS Z-8730-1980 (color difference representation method).

COMPARATIVE EXAMPLE 1

0.5 kg of carbon black "MA7" manufactured by Mitsubishi Chemical Corporation was put into a stainless steel angular container (15 cm×15 cm×12 cm in height) and the upper surface was uniformly adjusted (height: 11.5 cm), and the angular container was set in a closed container having a cylindrical powder-receiving portion having a diameter of 30 cm and a height of 35 cm and having a suction port, a pressure-regaining port and a pressure meter at its upper portion. Then, the powder-receiving portion was closed, and the inner air was aspirated from the suction port for 1 minute to reduce the inner pressure to a level of not higher than 1 mmHg. Then, the pressure-regaining port was opened to introduce air from the exterior, and the inner pressure was returned to atmospheric pressure in about 0.5 second.

Thus, a carbon black aggregate was obtained in the form of a block having a length of 13.0 cm, a width of 12.8 cm and a height of about .7 cm. The top of the block was blown off by wind pressure and had substantial irregularities. A part of this aggregate was cut out, and the density was measured and found to be 0.321 g/cc. With respect to this block, the hardness and the powdering ratio were measured by the same methods as in Example 1. The surface hardness was less than 56 g (less than the measurable lower limit), the interior hardness was 93 g, and the powdering ratio was 42.3 wt %, and the ink screen residue was 0.3 wt %. Thus, the powdering ratio was so high that it was not suitable for use.

It was attempted to package this aggregate in the same manner as in Example 1. During the handling, the aggregate underwent breakage and powdering and polluted the environment.

Using this packaged carbon black aggregate, an ink was prepared in the same manner as in Example 1. During the preparation of the ink, dusting occurred. As a result of the drawdown test, the L value was 27.7. This value was substantially the same as in Examples 1 to 7.

COMPARATIVE EXAMPLE 2

A carbon black aggregate was prepared in the same manner as in Comparative Example 1 except that in Comparative Example 2, carbon black "#45" was used instead of "MA7" manufactured by Mitsubishi Chemical Corporation. The density was 0.450 g/cc. The hardness, the powdering ratio and the screen residue of this aggregate were measured by the methods described in Example 1. As a result, the surface hardness was less than 56 g (less than the measurable lower limit), the inner hardness was 85 g, the powdering ratio was 47.5 wt %, and the screen residue was 12.5 wt %.

It was attempted to package this aggregate in the same manner as in Example 1. During the handling, the aggregate underwent breakage and powdering and polluted the environment.

Using this packaged carbon black aggregate, an ink was prepared in the same manner as in Example 1. During the preparation of the ink, dusting occurred.

COMPARATIVE EXAMPLE 3

A carbon black aggregate was prepared in the same manner as in Comparative Example 1 except that in Comparative Example 3, carbon black "#990" was used instead of "MA7" manufactured by Mitsubishi Chemical Corporation. The density was 0.212 g/cc. The hardness, the powdering ratio and the screen residue of this aggregate were measured by the methods described in Example 1. As a result, the surface hardness was 60 gr the inner hardness was 86 g, the powdering ratio was 41.7 wt %, and the screen residue was 0.7 wt %.

It was attempted to package this aggregate in the same manner as in Example 1. During the handling, the aggregate underwent breakage and powdering and polluted the environment.

Using this packaged carbon black aggregate, an ink was prepared in the same manner as in Example 1. During the preparation of the ink, dusting occurred.

COMPARATIVE EXAMPLE 4

Two sheets of 5 cm×10 cm were cut out from the PE(B) film. These two sheets were placed one on the other and the three sides were heat-sealed to obtain a bag. A few such EVA bags were prepared, and 114 g of carbon black "MA7" (particle size: 24 nm, DBP oil absorption: 65 cc/100 g carbon black, bulk density: 0.190 g/cc) manufactured by Mitsubishi Chemical Corporation to be used as a pigment for ink, was put into each bag. The remaining side of each of EVA bag was heat-sealed to obtain a carbon black package having carbon black packaged by the EVA film. At the time of packaging the carbon black by the bag, the carbon black scattered and polluted the environment.

While confirming the size of non-dispersed blocks in the prepared ink by means of a grined gauge, the ink was passed through a roll mill. As a result, the number of times of passing the ink through the three-roll mill required to bring the size to not larger than 10 μm, was six times.

Using this ink, printing was carried out in the same manner as in Example 1, whereupon the L value on the printed surface was measured. The L value was 27.7.

COMPARATIVE EXAMPLE 5

A commercial offset ink was prepared in the same manner as in Comparative Example 4 except that instead of "MA7", "MA7B" (bulk density: 0.384 g/cc) prepared by dry granulation of "MA7", was used. At the time of packaging the granulated carbon black, dusting occurred from the carbon black. An ink was prepared in the same manner as in Comparative Example 4. The number of times of passing the ink through the roll mill required to bring the non-dispersed blocks to a size of not larger than 10 μm, was five times. During the preparation of the ink, no dusting was observed. The L value of the printed surface obtained by using this ink, was 27.5.

COMPARATIVE EXAMPLE 6

An ink was prepared in the same manner as in Example 2 except that the "carbon black aggregate" (density: 0.598 g/cc) as made in Example 2, was used instead of the carbon black aggregate packaged in Example 2. During the preparation of the ink, the carbon black scattered and polluted the working environment.

The ink was passed through the roll mill in the same manner as in Example 1, whereby the number of times of passing the ink through the roll mill required to bring the non-dispersed blocks to a size of not larger than 10 μm, was three times. Further, the L value of the printed surface was measured in the same manner as in Example 1, whereby the L value was 27.5.

COMPARATIVE EXAMPLE 7

An ink was prepared in the same manner as in Example 1 except that the "carbon black MA7 powder" (bulk density: 0.190 g/cc) was used instead of the carbon black aggregate packaged in Example 1. During the preparation of the ink, the carbon black scattered and polluted the working environment.

The ink was passed through the roll mill in the same manner as in Example 1, whereby the number of times of passing the ink through the roll mill required to bring the non-dispersed blocks to the size of not larger than 10 μm, was six times. Further, the L value of the printed surface was measured in the same manner as in Example 1, whereby the L value was 27.8.

From the comparison between Examples 1 to 18 and Comparative Examples 1 to 7, it is evident that an ink or a coating material can be prepared without polluting the working environment by preparing an ink or a coating material by packaging a carbon black aggregate having a surface hardness of at least 70 g by a soluble film. Besides, surprisingly, it is possible to reduce the number of passing the ink through the roll mill during the preparation of the ink without impairing the nature of the ink prepared.

Application of the packaged carbon black aggregate to a colored resin

Examples 19 and 20 and Comparative Examples 8 to 11 demonstrate that it is possible to avoid pollution of the working environment by preparing a colored resin by using a carbon black aggregate packaged by a film which is miscible with the resin.

EXAMPLE 19

(1) Preparation of a carbon black aggregate 1 kg of carbon black #45 (particle size: 24 nm, DBP oil absorption: 53 cc/100 g carbon black, bulk density: 0.270 g/cc) manufactured by Mitsubishi Chemical Corporation was put into a carbon steel mold (inner size: 150 mm×150 mm, height: 360 mm) manufactured by Yuken K. K., and set in a 20 ton hydraulic press manufactured by Yuken K. K. Press molding was carried out by applying a pressure of 40 kgf/cm$^2$ to obtain a carbon black aggregate. The density of the aggregate was measured and found to be 0.761 g/cc.

(2) Packaging 77.66 g of a carbon black aggregate cut out from the above carbon black aggregate, was set in a Universal Sealer (Model: "T-600") manufactured by Kyowa Kikai K. K. in which a biaxially stretched polyethylene film having a thickness of 16 am was set, and heat sealing was carried out for 2 seconds at 180° C. This carbon black aggregate enclosed in the polyethylene film was put in a Universal Shrink Tunnel (Model: "NS-450") manufactured by Kyowa Kikai K. K., set at 150° C., and the film was heat shrinked for 10 seconds.

(3) Preparation of a colored resin

Into a Banbury mixer (B-250 Model) manufactured by Toyo Seiki Seisakusho K. K., 114.21 g of ABS resin (Sunlex SAN-C) manufactured by Mitsubishi Chemical Corporation, 1.14 g of an age resistor (Irganox 1010) manufactured by Chiba-Geigy AG, 1.14 g of calcium stearate and the packaged carbon black aggregate as disclosed in the previous paragraph, were charged. Setting the mixture temperature at 165° C., kneading was carried out for 12 minutes to obtain a master batch having a carbon black concentration of 40 wt %.

To 2.5 g of this 40% master batch, 97.5 g of ABS resin (Toughlex 450) manufactured by Mitsubishi Chemical Corporation was added, and the mixture was kneaded for 10 minutes by a twin-roll mill (No. 191-TM Model) manufactured by Yasuda Seiki Seisakusho K. K. set at 150° C. to obtain a colored resin sample.

The colored resin sample was formed into a sheet having a thickness of 0.3 mm, from which a specimen of 3×3 mm was cut out. A slide glass was placed on a hot plate set at 240° C. The specimen cut out in a size of 3×3 mm was placed on the slide glass and sandwiched by placing another slide glass thereon. A load was exerted for 10 minutes to stretch the specimen.

(4) Measurement of dispersibility

With respect to the stretched sample, areas of particles having a diameter of at least 7 μm were counted by means of an image treating apparatus (MKSIPS-1000) manufactured by Mitsubishi Chemical Corporation. From the inspected field area and the total area of particles having a particle size of at least 7 μm, a dispersion index was calculated in accordance with the following formula.

Dispersion index=total area of coarse particles/inspected field area×100000

As a result, the dispersion index was 1336. The results are shown in Table 3.

EXAMPLE 20

(1) Preparation of a carbon black aggregate

A carbon black aggregate was prepared in the manner as in Example 19.

(2) Packaging 69.44 g of a carbon black aggregate cut out from the above carbon black aggregate was set in a Universal Sealer (Model: "T-600") manufactured by Kyowa Kikai K. K. wherein a biaxially stretched polyethylene film having a thickness off 16 μm was set, and heat sealing was carried out for 2 seconds at 180.C. This carbon black aggregate enclosed by the polyethylene film was put into a Universal Shrink Tunnel (Model: "NS-450") manufactured by Kyowa Kikai K. K. set at 150° C., and the film was heat shrinked for 10 seconds.

(2) Preparation of a colored resin

Into a Banbury mixer (B-250 Model) manufactured by Toyo Seiki Seisakusho K. K., 101.49 g of a low density polyethylene resin (LF440HA) manufactured by Mitsubishi Chemical Corporation, 0.87 g of an age resistor (Irganox 1010) manufactured by Chiba-Geigy AG, 1.39 g of calcium stearate and the packaged carbon black aggregate as disclosed in the previous paragraph, were charged. Setting the mixture temperature at 115° C., kneading was carried out for 7 minutes to obtain a master batch having a carbon black concentration of 40 wt %.

To 1.5 g of this 40% master batch, 58.3 g of a low density polyethylene resin (F120) manufactured by Mitsubishi Chemical Corporation was added, and the mixture was kneaded for 10 minutes by a twin-roll mill (No. 191-TM Model) manufactured by Yasuda Seiki Seisakusho K. K. set at 130° C. to obtain a colored resin sample.

The colored resin sample was formed into a sheet having a thickness of 0.3 mm, from which a specimen of 3×3 mm was cut out. A slide glass was placed on a hot plate set at 240° C. The specimen cut out in a size of 3×3 mm was placed on the slide glass and sandwiched by placing another slide glass thereon. A load was exerted for 10 minutes to stretch the specimen.

(3) Measurement of dispersibility

The measurement was carried out in the same manner as in Example 19.

As a result, the dispersion index was 334. The results are shown in Table 4.

COMPARATIVE EXAMPLE 8

The same operation as in Example 19 was carried out except that the dry granulated product of carbon black "#45B" (particle size: 24 nm, DBP absorption: 53 cc/100 g carbon black, bulk density: 0.481 g/cc) manufactured by Mitsubishi Chemical Corporation, was used without molding or packaging.

As a result, the dispersion index was 1,739.

Further, at the time of weighing the granulated product of carbon black, fine powder contained in the granulated product scattered and polluted the working environment.

The results are shown in Table 3.

COMPARATIVE EXAMPLE 9

The same operation as in Example 19 was carried out except that the molded product of carbon black was used without packaging.

As a result, the dispersion index was 1,380. With the molded product of carbon black, powdering was substantially reduced as compared with the starting material powder. However, as compared with the packaged carbon black molded product used in Example 19, prevention of the environmental pollution was not adequate. The results are shown in Table 3.

TABLE 3

Example and Comparative Examples

|  | Carbon black | Dispersion index | Environmental pollution |
|---|---|---|---|
| Example 19 | Packaged carbon black aggregate | 1,336 | Nil |
| Comparative Example 8 | Dry granulated product of carbon black | 1,739 | Substantial pollution |
| Comparative Example 9 | Carbon black aggregate | 1,380 | Slight pollution |

COMPARATIVE EXAMPLE 10

The same operation as in Example 20 was carried out except that the dry granulated product of carbon black "#45B" (particle size: 24 nm, DBP oil absorption: 53 cc/100 g carbon black, bulk density: 0.481 g/cc) manufactured by Mitsubishi Chemical Corporation was used without molding or packaging.

As a result, the dispersion index was 533. Further, at the time of weighing the granulated product of carbon black, fine powder contained in the granulated product scattered and polluted the environment, the results are shown in Table 4.

COMPARATIVE EXAMPLE 11

The same operation as in Example 20 was carried out except that the carbon black aggregate was used without packaging.

As a result, the dispersion index was 346. With the carbon black aggregate, dusting was substantially reduced as compared with the starting material powder. However, as compared with the packaged carbon black aggregate used in Example 20, prevention of the environmental pollution was not adequate. The results are shown in Table 4.

TABLE 4

|  | Carbon black | Dispersion index | Environmental pollution |
|---|---|---|---|
| Example 20 | Packaged carbon black aggregate | 334 | Nil |
| Comparative Example 10 | Dry granulated product of carbon black | 533 | Substantial pollution |
| Comparative Example 11 | Carbon black aggregate | 346 | Slight pollution |

The carbon black aggregates packaged by the ABS resin as shown in Example 19 and Comparative Examples 8 and 9 and by the polyethylene as shown in Example 20 and Comparative Examples 10 and 11, were excellent in the dispersibility and showed excellent effects for preventing environmental pollution.

Application of the packaged carbon black aggregate to a rubber

Example 21 and Comparative Examples 12 and 13 demonstrate prevention of environmental pollution by using a packaged carbon black aggregate in the preparation of a rubber.

EXAMPLE 21

(1) Preparation of a carbon black aggregate 500 g of carbon black "DIA-I" (non-granulated product) (particle size: 24 nm, DBP oil absorption: 114 cc/g 100 carbon black, bulk density: 0.169 g/cc) manufactured by Mitsubishi Chemical Corporation was put into a carbon steel (SS400) mold (inner size: 150 mm×150 mm, height: 360 mm) manufactured by Yuken K. K., and set in a 20 ton hydraulic press manufactured by Yuken K. K. Press molding was carried out at a molding pressure of 88.9 kgf/cm$^2$, and the density of the obtained carbon black aggregate was measured and found to be 0.522 g/cc.

(2) Packaging

The above carbon black aggregate was set in a Universal Sealer (Model: "T-600") manufactured by Kyowa Kikai K. K. in which a polyethylene film having a thickness of 20 μm was set, and heat sealing was carried out for 2 seconds at 150° C. This carbon black aggregate enclosed by the polyethylene film was put into a Universal Shrink Tunnel (Model: "NS-450") manufactured by Kyowa Kikai K. K. set at 150° C., and the film was heat-shrinked for 10 seconds.

(3) Kneading of rubber

This packaged carbon black aggregate was mixed with the following components by a Banbury mixer and an open roll mixer to obtain a rubber composition.

| | | | | |
|---|---|---|---|---|
| Natural rubber ("SMR-L") | | | 100 parts by weight | |
| Packaged carbon black aggregate | | | 50 parts by weight | |
| Zinc white | | | 5 parts by weight | |
| Stearic acid | | | 3 parts by weight | |
| Age resistor ("Santoflex 13" manufactured by Monsanto Co.) | | | 1 part by weight | |
| Sulfur | | | 2 parts by weight | |
| Vulcanization accelerator (Nokseler CZ manufactured by Ouchi Shinko K.K.) | | | 0.7 part by weight | |

During the preparation of the rubber composition, no environmental pollution due to scattering of carbon black was observed.

(4) Test of rubber

Such a rubber composition was subjected to press vulcanization at 160° C. to obtain a vulcanized rubber test specimen. Various tests were carried out by the following testing methods, and the physical properties were measured.

The loss factor (tanδ) was measured under the following conditions using "DVE Rheospectrer" manufactured by Kabushiki Kaisha Rheology.

Static distortion: 10%, dynamic distortion (amplitude): 2%, frequency: 10 Hz, measuring temperature: 60° C.

The heat build-up was measured under the following conditions using Good Rich Flexometer manufactured by Kabushiki Kaisha Kamishima Seisakusho.

Test temperature: 35° C., load: 24 pounds, testing time: 25 minutes

Dispersibility (D%) of reinforcing particles in rubber was measured in accordance with the method for measuring dispersibility of carbon black i.e. ASTM D2663-B Method (method for counting agglomerates). Namely, a vulcanized rubber was sliced into a thin film by a Sledge type microtome (manufactured by Leitz Co.). Then, the total area occupied by agglomerates of reinforcing particles (carbon black) of at least 5 μm in the blend, was measured by an optical microscope, and the percentage of reinforcing particles dispersed in a size of not larger than 5 μm was obtained from the total cross-sectional area (calculated value) of reinforcing particles added to the blend and taken as the dispersibility (D%).

As a result, the loss factor at 60° C. was 0.139, the heat build-up was 31.0° C., and D% was 99.2%. The results are summarized in Table 5.

COMPARATIVE EXAMPLE 12

A test of rubber was carried out in the same manner as in Example 21 except that the carbon black was changed to "DIA-I" (wet granulated product) (bulk density: 0.351 g/cc) manufactured by Mitsubishi Chemical Corporation.

As a result, the loss factor at 60° C. was 0.152, the heat build-up was 35.0° C., and D% was 95.4%. Further, at the time of weighing the granulated product of carbon black, fine powder contained in the granulated product scattered and polluted the environment.

COMPARATIVE EXAMPLE 13

The same operation as in Example 13 was carried out except that the carbon black aggregate was used without packaging.

As a result, the loss factor at 60° C. was 0.140, the heat build-up was 31.4° C., and D% was 99.1%. With the carbon black aggregate, dusting was substantially reduced as compared with the starting material powder. However, as compared with the packaged carbon black aggregate as used in Example 21, prevention of the environmental pollution was not adequate. The results are shown in Table 5.

TABLE 5

| | Loss factor | Heat build-up (° C.) | Dispersion index (D%) | Environmental pollution |
|---|---|---|---|---|
| Example 21 | 1.39 | 31.0 | 99.2 | Nil |
| Comparative Example 12 | 1.52 | 35.0 | 95.4 | Substantial pollution |
| Comparative Example 13 | 1.40 | 31.4 | 99.1 | Slight pollution |

From the comparison of Example 21 and Comparative Examples 12 and 13, the effect for reducing environmental pollution by packaging the carbon black aggregate is remarkable. Further, Example 21 shows a high dispersibility in spite of the fact that the bulk density is high as compared with Comparative Example 12.

Improvement of the dispersibility by a carbon black aggregate having cracks

Examples 22 and 23 and Comparative Examples 14 and 15 demonstrate that not only environmental pollution can be avoided but also high dispersibility can be obtained by preliminarily imparting cracks to the packaged carbon black aggregate.

EXAMPLE 22

(1) Preparation of a carbon black aggregate 0.5 kg of carbon black "MA7" (particle size: 24 nm, DBP oil absorption: 65 cc/100 g carbon black, bulk density: 0.190 g/cc) manufactured by Mitsubishi Chemical Corporation, was put into a carbon steel mold (inner size: 150 mm×150 mm, height: 350 mm) manufactured by Yuken K. K. and set in a hydraulic press machine manufactured by Yuken K. K. Press molding was carried out by applying a pressure of 22.2 kgf/cm$^2$ to obtain a carbon black aggregate. The density of the obtained aggregate was measured and found to be 0.598 g/cc. From this aggregate, eight blocks of 30 g were cut out.

(2) Preparation of a heat shrink package

The above carbon black aggregate was set in a Universal Sealer (Model: T-600) manufactured by Kyowa Kikai K. K. wherein an ethylene-vinyl acetate copolymer (hereinafter referred to as EVA) (Model: LV540, vinyl acetate content: 20 wt %) manufactured by Mitsubishi Chemical Corporation and blow-molded to have a thickness of 30 μm, was set, and heat sealing was carried out for 2 seconds at 180° C. This carbon black molded product enclosed in the EVA film was put into a Universal Shrink Tunnel (Model: NS-450) manufactured by Kyowa Kikai K. K. set at 150° C., and the film was heat-shrinked for 10 seconds. In the same manner, remaining seven blocks were packaged.

(3) Imparting cracks to the carbon black aggregate

The eight packaged carbon black aggregates were passed through a pressing roller manufactured by Kabushiki Kaisha Ishikawa Tekko. No breakage or rupture of the EVA bags was observed. The appearance remained to be a block form although there was a partial breakage.

(4) Measurement of initial dispersibility of ink

The measurement was carried out by using four aggregates as described above (30 g/aggregate) as carbon black aggregates, by the same measuring method as in Example 1 (4) except that "REDUCTUS #220" was changed to No. 6

Solvent (manufactured by Nisseki), and the solvent was heated to 70° C. The ink screen residue was 3.6 wt %.

(5) Observation of environmental pollution

During rotation of the homomixer, no scattering of carbon black was observed, and no environmental pollution occurred.

(6) Measurement of the particle size

To confirm disintegration by cracks imparted, the coverings of the remaining four aggregates were broken, and the average particle size was measured and found to be 17.3 mm.

EXAMPLE 23

A packaged carbon black aggregate having cracks imparted, was prepared in the same manner as in Example 22 except that as a method for imparting cracks in Example 22, a vibration plate of 15 cm×15 cm attached to a chipping corking air hammer manufactured by Fuji Air Tools, was contacted to the packaged carbon black aggregate for 10 seconds, instead of the pressing roller. The bag did not break, and the outer appearance did not change. A sample was prepared in the same manner as in Example 22, and the screen residue and the particle size were measured. The ink screen residue was 2.5 wt %. Further, during the preparation of the ink, no environmental pollution was observed. The average particle size was 11.2 mm.

COMPARATIVE EXAMPLE 14

The ink screen residue was measured by the same method as in Example 22 except that carbon black "MA7" was used as enclosed in a bag made of the EVA film in a powder state. As a result, the ink screen residue was 4.0 wt %. Further, during the measurement of the ink screen residue, the EVA film ruptured, and a part of the carbon black scattered and polluted the environment.

COMPARATIVE EXAMPLE 15

The ink screen residue was measured in the same manner as in Example 22 except that no operation of imparting cracks was carried out. The environmental pollution was not observed, but the screen residue was high as compared with Examples 22 and 23.

As shown by Examples 22 and 23 and Comparative Examples 14 and 15, still higher dispersibility can be obtained by preliminarily imparting cracks to the packaged carbon black aggregate.

Various packaging methods

Examples 24 to 29 demonstrate the effect for preventing environmental pollution by various covering or packaging methods, as compared with Comparative Examples 16 to 20. Comparative Example 19 was compared with Example 21, and Comparative Example 20 was compared with Example 19, to confirm the effect.

EXAMPLE 24

(1) Preparation of a carbon black aggregate

A carbon black aggregate was prepared in the same manner as in Example 19. (Brand: #45, the density of the molded product: 0.761 g/cc)

(2) Preparation of a package

The above carbon black aggregate was set in an overwrapping machine (Model: KW201 Model) manufactured by Kohoku Seiko K. K. in which a polyvinyl alcohol film ("Hyceron H") manufactured by Nichigo Film K. K., having a thickness of 30 $\mu$m and treated by embossing, was set, and packaging was carried out. As the packaging method, caramel packaging was used, and joining of the films was carried out by bonding by means of a polyvinyl alcohol adhesive ("Nichibon") manufactured by Nippon Gosei K. K. (3) Results The carbon black aggregate was packaged by the polyvinyl alcohol film in close contact with the exterior while maintaining its shape. The carbon black did not leak out of the bag, and no environmental pollution occurred.

EXAMPLE 25

(1) Preparation of a carbon black aggregate

An aggregate was prepared in the same manner as in Example 24.

(2) Preparation of a pillow package

The above carbon black aggregate was set in a Universal Sealer (Model: "T-600") manufactured by Kyowa Kikai K. K. wherein a polyvinyl alcohol film ("Hyceron H") manufactured by Nichigo Film K. K. treated by embossing and having a thickness of 30 $\mu$m, was set, and heat sealing of the three sides was carried out for 2 seconds at 180° C. to carry out pillow packaging of the carbon black aggregate.

(3) Results

The carbon black aggregate was packaged by the polyvinyl alcohol film while maintaining its shape. The carbon black did not leak from the bag, and no environmental pollution was observed.

EXAMPLE 26

(1) Preparation of a carbon black aggregate

A carbon black aggregate was prepared in the same manner as in Example 5.

(2) Preparation of a heat shrink package 114 g of a carbon black aggregate cut out from the above carbon black aggregate, was set in a Universal Sealer (Model: "T-600") manufactured by Kyowa Kikai K. K. wherein an ethylene vinyl acetate copolymer ("EVA") (Product No. LV440, vinyl acetate content: 15 wt %) manufactured by Mitsubishi Chemical Corporation, having a thickness of 30 $\mu$m and prepared by blow molding, was set, and heat sealing was carried out for 2 seconds at 180° C. This carbon black aggregate enclosed by the "EVA" film was put into a Universal Shrink Tunnel (Model: "NS-450") manufactured by Kyowa Kikai K. K. set at 150° C., and the film was heat-shrinked for 10 seconds. The carbon black did not leak from the bag, and no environmental pollution was observed.

(3) Preparation of an ink

An ink was prepared in the same manner as in Example 5 except that the above carbon black aggregate was used as the carbon black. During the preparation of the ink, no dusting of carbon black or no environmental pollution was observed.

(4) Evaluation of the dispersibility by a three roll mill

The dispersibility was evaluated by the method disclosed in Example 1. As a result, the maximum particle size was 18 $\mu$m as a result of the first measurement, 15 $\mu$m as a result of the second measurement, and 7 $\mu$m as a result of the third measurement.

EXAMPLE 27

(1) Preparation of a carbon black aggregate

The carbon black aggregate prepared in Example 5 was used.

(2) Coating 200 g of a rosin resin (tradename: "Hartol R-X", softening point: 79° C.) manufactured by Harima Kasei K. K. was put into a stainless steel beaker having a capacity of 500 ml. This beaker was dipped in an oil bath (Model: "471") manufactured by BUCHI K. K. set at 160° C. to melt the rosin resin.

From the above carbon black aggregate, 114 g was cut out in a form of a block, and the molten rosin resin was coated by means of a brush. The surface of the carbon black aggregate coated by the rosin resin was touched by a hand, whereby the hand was not stained with carbon black.

(3) Preparation of an ink

An ink was prepared in the same manner as in Example 5. During the preparation of the ink, no dusting of carbon black or no environmental pollution was observed.

(4) Evaluation of the dispersibility by a three roll mill

The dispersibility was evaluated in the same manner as in Example 1. As a result, the maximum particle size was 19 $\mu$m as a result of the first measurement, 14 $\mu$m as a result of the second measurement, and 7 $\mu$m as a result of the third measurement.

EXAMPLE 28

(1) Preparation of a carbon black aggregate 2 kg of carbon black "#2650" (particle size: 13 nm, DBP oil absorption: 73 cc/100 g carbon black, bulk density: 0.077 g/cc) manufactured by Mitsubishi Chemical Corporation, was put into a carbon steel mold (inner size: 350 mm×350 mm, height: 500 mm) manufactured by Yuken K. K., and set in a 20 ton hydraulic press manufactured by Yuken K. K. Press molding was carried out by applying a pressure of 2.0 kgf/cm$^2$, and the density of the obtained carbon black aggregate was measured and found to be 0.266 g/cc.

(2) Coating 200 g of a rosin resin (tradename: "Hartol R-X", softening ponit; 79° C.) manufactured by Harima Kasei K. K. was put into a stainless steel beaker having a capacity of 500 ml. This beaker was dipped in an oil bath (Model: "471") manufactured by BUCHI K. K. set at 160° C. to melt the tall rosin.

From the above carbon black aggregate, 3 g was cut out, and the molten tall rosin was coated thereon by means of a brush. The surface of the carbon black aggregate coated by the rosin resin was touched by a hand, whereby the hand was not stained with carbon black.

(3) Preparation of a coating material 90 g of glass beads having a diameter of from 2.5 to 3.5 mm, manufactured by Tokyo Glass K. K. were put into a mayonnaise bottle of 140 cc. Then, 16 g of a melamine alkyd resin varnish (Amylak 1026) manufactured by Kansai Paint K. K., 10 g of Amylak Thinner manufactured by Kansai Paint K. K. and the above coated carbon black aggregate were put into the mayonnaise bottle.

This mayonnaise bottle was set on a single type paint shaker (RC-5000A) manufactured by Red Devil Co. and shaked for 15 minutes. This black varnish was cooled to room temperature, and then the size of non-dispersed block carbon black within a range of from 0 to 50 $\mu$m was measured by a grined gauge (model: R1110) manufactured by Kabushiki Kaisha Kamishima Seisakusho. The result of measurement by the grined gauge was 7 $\mu$m.

Further, 50 g of "Amylak 1026 Clear" was put into this mayonnaise bottle, followed by mixing for 10 minutes by the paint shaker to obtain a black coating material.

(4) Evaluation of blackness

A part of the black coating material was sampled (about 1 cc), and put on a PET film (Trancee G, thickness: 180 $\mu$m) manufactured by Fuji Film Co., Ltd. and stretched by a bar coater (No. 24) manufactured by Toyo Seiki K. K. This PET film was subjected to baking for 20 minutes in an air circulating dryer (Automatic Drying Oven SS-200N) manufactured by Ikeda Rika K. K. set at 120° C. The L value of the black coating film thus baked was measured by a color difference meter (Spectro Color Meter SE-2000) manufactured by Nippon Denshoku K. K. The L value was 4.23.

During the preparation of the coating material, no dusting of carbon black or no environmental pollution was observed.

EXAMPLE 29

(1) Preparation of an aggregate

An aggregate was prepared in the same manner as in Example 26.

(2) Preparation of a heat shrink package 3 g of a carbon black aggregate cut out from the above carbon black aggregate, was set in a Universal Sealer (Model: "T-600") in which a biaxially stretched polystyrene film having a thickness of 16 $\mu$m, was set, and heat sealing was carried out for 2 seconds at 180° C. This carbon black aggregate enclosed by the polystyrene film was put into a Universal Shrink Tunnel (Model: "NS-450") manufactured by Kyowa Kikai K. K. set at 150° C., and the film was heat-shrinked for 10 seconds.

(3) Preparation of a coating material

The size of the non-dispersed block carbon black within a range of from 0 to 50 $\mu$m was measured in the same manner as in Example 35(3) except that the carbon black aggregate as identified in the above step (2) was used. The result of measurement by the grined gauge was 7 $\mu$m.

Further, 50 g of "Amylak 1026 Clear" was put into this mayonnaise bottle, and the mixture was mixed by a paint shaker for 10 minutes to obtain a black coating material.

(4) Evaluation of blackness

The measurement was carried out in the same manner as in Example 17. The L value was 4.78.

COMPARATIVE EXAMPLE 16

The same operation as in Example 29 was carried out except that carbon black powder "MA$_7$" manufactured by Mitsubishi Chemical Corporation was used instead of the carbon black aggregate used in Example 29. The value measured by the grined gauge was 8.0 $\mu$m, and the L value of the black coating material was 4.83.

At the time of measuring the predetermined amount, the carbon black powder scattered around and polluted the environment.

COMPARATIVE EXAMPLE 17

The same operation as in Example 26 was carried out except that the carbon black aggregate was used without packaging.

As a result, the number of times of passing the ink through the three roll mill required to bring the size of the non-dispersed blocks to a level of not larger than 10 $\mu$m was three times, and the size of the non-dispersed blocks was 7.5 $\mu$m.

With the carbon black aggregate, dusting was substantially reduced as compared with the starting material powder. However, as compared with the coated carbon black aggregates used in Examples 26 and 27, prevention of the environmental pollution was not adequate.

COMPARATIVE EXAMPLE 18

The same operation as in Example 29 was carried out except that the carbon black aggregate was used without packaging.

As a result, the blackness of the prepared coating material i.e. the L value by the color difference meter was 4.25.

With the carbon black aggregate, dusting was substantially reduced as compared with the starting material powder. However, as compared with the packaged carbon black aggregate used in Example 29, prevention of the environmental pollution was not adequate.

COMPARATIVE EXAMPLE 19

The same operation as in Example 21 was carried out except that the carbon black aggregate was used without packaging.

As a result, the loss factor at 60° C. was 0.141, the heat build-up was 31.2° C., and D% was 99.1%. With the carbon black aggregate, dusting was substantially reduced as compared with the starting material powder. However, as compared with the packaged carbon black aggregate used in Example 21, prevention of the environmental pollution was not adequate.

COMPARATIVE EXAMPLE 20

The same operation as in Example 19 was carried out except that the carbon black aggregate was used without packaging.

As a result, the dispersion index was 1,380. With the carbon black aggregate, dusting was substantially reduced as compared with the starting material powder. However, as compared with the packaged carbon black aggregate used in Example 19, prevention of the environmental pollution was not adequate.

As shown in Examples 24 to 29, environmental pollution by carbon black can be prevented also by using various packaging methods by means of soluble materials.

Effects of the present invention

The present invention provides a carbon black aggregate which undergoes no substantial powdering or breakage during transportation or storage and which is excellent in dispersibility when it is used for an ink or a coating material. The present invention is an epoch-making invention in that the carbon black aggregate of the present invention has a bulk density substantially improved as compared with the conventional granulated products, whereby the costs for transportation and storage, which used to constitute a substantial proportion in the costs relating to carbon black, can be reduced to a large extent.

By preparing an ink by means of the carbon black aggregate of the present invention, it is possible to substantially reduce the treating time or the number of passing through the dispersing machine in the preparation of an ink, and the obtainable ink is not inferior in the basic ink performance (blackness and gloss) as compared with the one prepared by using a conventional product such as a powdery or granulated product.

Further, when the carbon black aggregate of the present invention is used for preparing a coating material, the blackness of the coating material can be increased without requiring any special treatment or any expensive machine. When the carbon black aggregate of the present invention is used for preparation of a resin composition, it is possible to prepare a colored resin wherein the dispersibility of carbon black is high.

A rubber composition prepared by using the carbon black aggregate of the present invention, can show high dispersibility, a low loss factor and a low heat build-up. Besides, the balance of these physical properties can be controlled by adjusting the density of the carbon black aggregate.

To obtain the carbon black aggregate of the present invention, no such a large energy or a large apparatus as used to be required for granulation of carbon black by the conventional technique, is required. Namely, the carbon black aggregate of the present invention can be commonly used and can be produced by a relatively small investment. Further, carbon black is in the form of an aggregate having a very small powdering ratio and further packaged, whereby pollution due to dusting can be substantially suppressed. Especially when it is packaged with a soluble material, pollution due to dusting can be reduced substantially to zero, whereby the working environment can be remarkably improved.

We claim:

1. A carbon black aggregate having a surface hardness of at least 70 g and having a covering.

2. The carbon black aggregate according to claim 1, wherein the surface hardness is from 300 to 800 g.

3. The carbon black aggregate according to claim 1, wherein the hardness of the surface is higher than the hardness of the interior.

4. The carbon black aggregate according to claim 1, wherein the density σ (g/cc) of the carbon black aggregate is at least $$\sigma = 8.190 \times 10^{-3} D - 3.824 \times 10^{-3} L + 0.516$$

and at most $$\sigma = 3.265 \times 10^{-3} D - 3.334 \times 10^{-3} L + 1.173$$

wherein D is the arithmetic mean primary particle size (nm) of carbon black by an electron microscope, and L is the DBP oil absorption (ml/100 g).

5. The carbon black aggregate according to claim 1, wherein the carbon black aggregate has cracks.

6. The carbon black aggregate according to claim 1, wherein the covering is made of a soluble material.

7. The carbon black aggregate according to claim 1, wherein the covering is made of a polyethylene having a density of at most 0.900 g/cc.

8. A method for producing an ink composition, which comprises mixing the carbon black aggregate as defined in claim 1 with a varnish.

9. A method for producing a coating composition, which comprises mixing the carbon black aggregate as defined in claim 1 with a vehicle and a resin component.

10. A method for producing a resin composition, which comprises mixing the carbon black aggregate as defined in claim 1 with a resin component.

11. A method for producing a rubber composition, which comprises mixing the carbon black aggregate as defined in claim 1 with a rubber component.

* * * * *